United States Patent
Takiguchi

(10) Patent No.: US 7,168,893 B2
(45) Date of Patent: Jan. 30, 2007

(54) THROW-AWAY TIPPED DRILL, THROW-AWAY TIP, AND DRILL MAIN BODY

(75) Inventor: Syoji Takiguchi, Gifu-ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 346 days.

(21) Appl. No.: 10/794,473

(22) Filed: Mar. 4, 2004

(65) Prior Publication Data

US 2004/0175245 A1 Sep. 9, 2004

(30) Foreign Application Priority Data

| Mar. 5, 2003 | (JP) | ............................. 2003-058473 |
| Mar. 25, 2003 | (JP) | ............................. 2003-083044 |
| Dec. 17, 2003 | (JP) | ............................. 2003-419408 |
| Jan. 20, 2004 | (JP) | ............................. 2004-011826 |
| Jan. 20, 2004 | (JP) | ............................. 2004-011827 |

(51) Int. Cl.
*B23B 51/02* (2006.01)

(52) U.S. Cl. ........................ 408/233; 408/227; 408/713

(58) Field of Classification Search ................ 408/226, 408/227, 228, 231, 233, 713; B23B 51/02
See application file for complete search history.

(56) References Cited

U.S. PATENT DOCUMENTS

| 3,991,454 A | * | 11/1976 | Wale ............................ 407/56 |
| 4,060,335 A | | 11/1977 | Holloway et al. |
| 5,599,145 A | * | 2/1997 | Reinauer et al. ............ 408/233 |
| 5,630,478 A | * | 5/1997 | Schimke .................. 175/420.1 |
| 5,904,455 A | * | 5/1999 | Krenzer et al. ............. 408/144 |
| 6,146,060 A | | 11/2000 | Rydberg et al. |
| 6,196,769 B1 | | 3/2001 | Satran et al. |
| 6,514,019 B1 | | 2/2003 | Schulz |
| 2001/0026738 A1 | | 10/2001 | Kojima |
| 2002/0114675 A1 | | 8/2002 | Krenzer |
| 2005/0129473 A1 | * | 6/2005 | Heule et al. ................. 408/231 |

(Continued)

FOREIGN PATENT DOCUMENTS

DE 19 11 594 A1 9/1970

(Continued)

OTHER PUBLICATIONS

Patent Abstracts of Japan for JP11-197923 published on Jul. 27, 1999.

(Continued)

*Primary Examiner*—Daniel W. Howell
(74) *Attorney, Agent, or Firm*—Darby & Darby

(57) ABSTRACT

In a throw-away tipped drill, a slit is formed at the bottom surface of a tip attachment seat which faces towards the end of its axial line direction, with this slit extending towards the rear of the axial line direction. Furthermore, when seen from the end of the axial line direction, this slit is arranged as being displaced so as to be closer to a second end portion into which a shaft portion of a clamp bolt is threaded than to a first end portion which is pressed by a head portion of that clamp bolt. As a result, when, using the clamp bolt, the pair of outer side surfaces of the tip are pressed by the pair of internal side surfaces of the tip attachment seat, the pressing forces are mutually equal to one another.

13 Claims, 12 Drawing Sheets

U.S. PATENT DOCUMENTS

2005/0196244 A1* 9/2005 Takiguchi et al. .......... 408/231

FOREIGN PATENT DOCUMENTS

| JP | 11-104913 | A1 | 4/1999 |
| JP | 11-197923 | A1 | 7/1999 |
| JP | 2002-254230 | A1 | 9/2002 |
| JP | 2003-71622 | A1 | 3/2003 |
| JP | 2003-175413 | A1 | 6/2003 |
| WO | WO 00/07761 | A1 * | 2/2000 |

OTHER PUBLICATIONS

Patent Abstracts of Japan for JP2002-254230 published on Sep. 10, 2002.
Patent Absracts of Japan for JP2003-71622 published on Mar. 12, 2003.
Patent Abstracts of Japan for JP2003-175413 published on Jun. 24, 2003.

* cited by examiner

PRIOR ART FIG.15
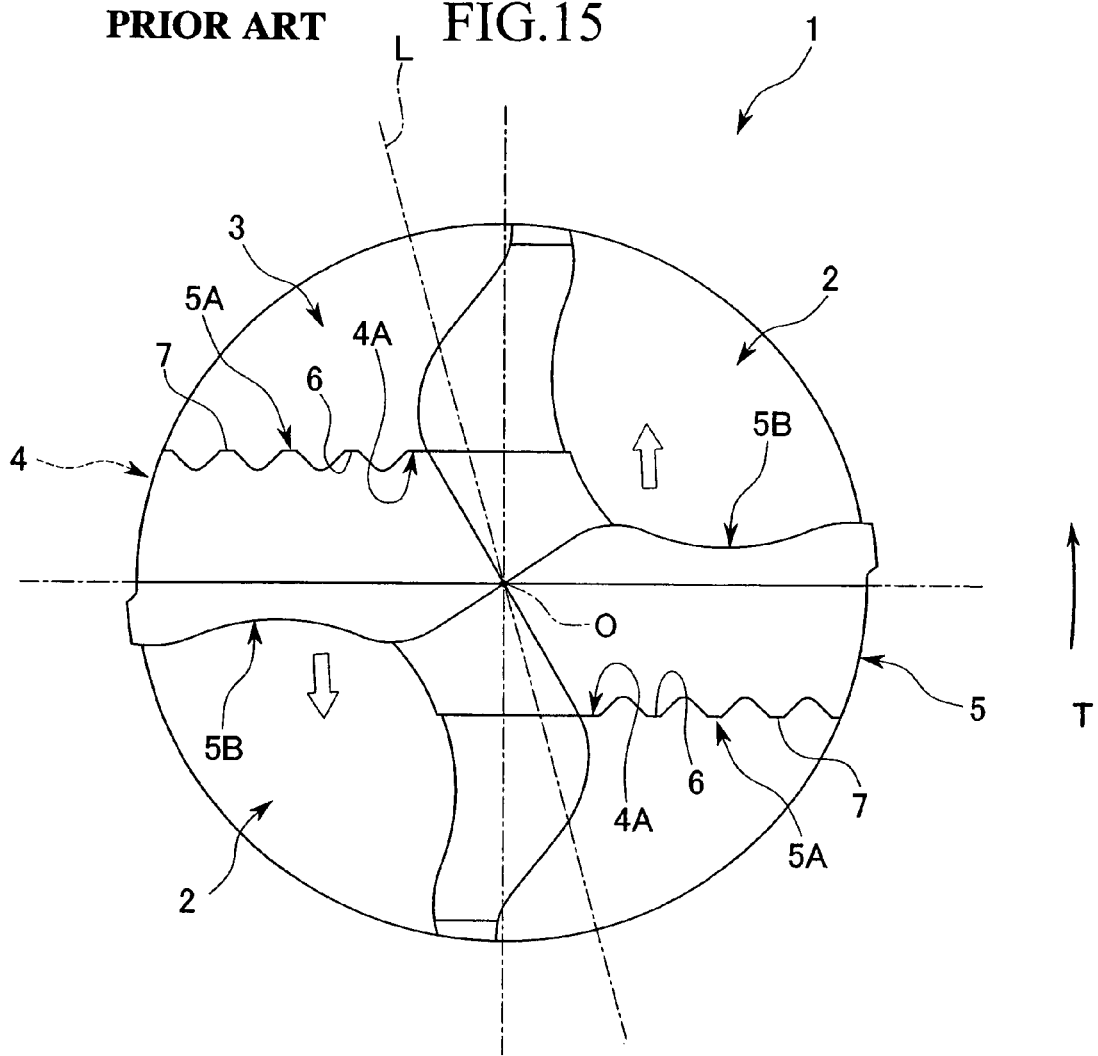
PRIOR ART
FIG.16
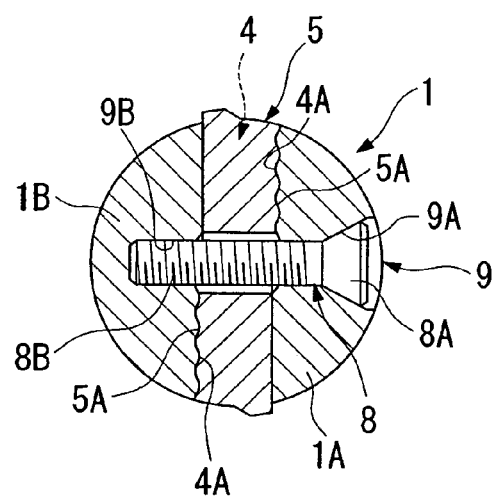

THROW-AWAY TIPPED DRILL, THROW-AWAY TIP, AND DRILL MAIN BODY

BACKGROUND OF THE INVENTION

1. Field of the Invention

The present invention relates to a throw-away tipped drill, to which a throw-away tip of an approximately flat plate shape and formed with a sharp cutting edge (hereinafter sometimes also termed simply a "tip") is fitted in a detachable and attachable manner at a tip attachment seat thereof which is made as a concave groove formed in an end portion of the drill main body; and the present invention also relates to such a throw-away tip, and to such a drill main body.

Priority is claimed on Japanese Patent Applications No. 2003-58473, filed Mar. 5, 2003, No. 2003-83044, filed Mar. 25, 2003, No. 2003-419408, filed Dec. 17, 2003, No. 2004-11826, filed Jan. 20, 2004, and No. 2004-11827, filed Jan. 20, 2004, the contents of the applications are incorporated herein by reference by their entirety.

2. Description of Related Art

One example of such a type of throw-away drill is shown in, for example, Japanese Patent Application, First Publication No. Hei 11-197923. With this drill, a round hole is formed in the bottom surface of a concave groove shaped tip attachment seat which opens at an end surface of the drill main body, and a shaft portion which can be fitted into the above described round hole is provided at an after end surface of an approximately flat plate shaped tip which is fitted to this tip attachment seat. The tip is fitted to the tip attachment seat by the shaft portion being inserted into the round hole, so that an engagement member which projects from the inner periphery of the round hole engages with a cutaway portion which is formed upon the shaft portion.

With this throw-away tipped drill, since the fitting of the tip can be performed just by inserting the shaft portion of the tip into the round hole in the tip attachment seat, accordingly it possesses the beneficial feature that it is easy to perform the task of changing the tip. However, since the connection between the tip and the drill main body is only performed via the shaft portion, there has been a possibility that the accuracy of position determination (centering) of the tip with respect to the drill main body can be insufficient, which can exert a negative influence upon the accuracy with which a workpiece can be processed using the drill.

In this connection, in a patent application which is assigned to the same assignee as the present application, there has previously been proposed a throw-away tipped drill as shown in FIGS. 15 and 16. With this throw-away tipped drill, a pair of chip disposal grooves 2 are formed on the outer periphery of a drill main body 1 which rotates around an axial line O, and, at an end portion of the drill main body 1, there is formed a concave groove shaped tip attachment seat 4 which, along with communicating to these chip disposal grooves 2, also opens to the end surface 3 of the drill main body 1.

On the tip attachment seat 4, there is formed a tip 5 of approximately flat plate shape with a cutting edge formed upon its edge, and a pair of outer side surfaces 5A of said tip 5 are opposed to a pair of internal side surfaces 4A of the tip attachment seat 4; and, moreover, raked surfaces 5B are inlaid into the outer side surfaces 5A of this tip 5, being formed at portions which face forward along the rotational direction T of the drill, in a state of opening to the chip disposal grooves 2. Further, the tip 5 is clampingly supported by the tip attachment seat by the pair of internal side surfaces 4A of the tip attachment seat 4 being mutually squeezed together by the use of a clamp bolt 8 (in FIG. 15, only the axial line L of this clamp bolt 8 is shown) which is screwed into the end portion of the drill main body 1 so as to cross across the tip attachment seat 4.

Guide grooves 6 which extend along the axial line O are formed upon portions of the internal side surfaces 4A of the tip attachment seat 4 which face forwards in the rotational direction T of the drill. Furthermore, convex portions 7 which can be engaged with the above guide grooves 6 are formed upon portions of the outer side surfaces 5A of the tip 5 which face rearwards in the rotational direction T of the drill, and the accuracy by which the tip 5 is maintained in position with respect to the drill main body 1 is enhanced by the mutual engagement of these guide grooves 6 and these convex portions 7 with one another.

As shown in FIG. 16, the clamp bolt 8 is screwed into a through hole 9 which is provided as crossing across the tip attachment seat 4 in an end portion of the drill main body 1 when viewed in a perpendicular cross section to the axial line of the drill main body 1. This through hole 9 is formed so as to extend along the diametrical direction of the drill main body 1, through both a one (a first end portion 1A) and another (a second end portion 1B) of two end portions 1A and 1B, into which the end portion of the drill main body 1 is divided by the tip attachment seat 4; and its opening end, along with opening to the outer peripheral surface of the first end portion 1A of the drill main body 1A, is made as a concave portion 9A which houses the head portion 8A of the clamp bolt 9 which is inserted into the through hole 9, while its portion which is positioned within the second end portion 1B is made as a threaded portion 9B, into which a threaded portion which is formed upon the side surface of the shaft portion 8B of the clamp bolt 8 which is inserted into the through hole 9 is screwingly engaged.

In this drill, by inserting the clamp bolt 8 into the through hole 9, and by screwingly engaging together the threaded portion which is formed upon its shaft portion 8B and the threaded portion 9B which is formed in the through hole 9, the first end portion 1A and the second end portion 1B are elastically deformed so as to mutually contact against the pair of internal side surfaces 4A of the tip attachment seat 4. As a result, the pair of outer side surface 5A of the tip 5 are pressed against the pair of internal side surfaces 4A of the tip attachment seat 4, whereby the tip 5 is clamped and supported by the tip attachment seat 4. Since in this manner the tip 5 is supported by the tip attachment seat from its rear end (the rear end side of the drill main body 1) and from the rearward side of the rotational direction T of the drill, thereby, when performing the processing of a workpiece by drilling a hole therein, the tip 5 is held by the tip attachment seat 4 so as to be pressed thereagainst and fixed thereto.

However, when using a clamp bolt 8 of the above described type for holding the tip 5, the first end portion 1A of the drill main body 1 is elastically deformed so as to be deflected inwards by the concave portion 9A of the through hole 9 which is formed in said first end portion 1A being pressed by the head portion 8A of the clamp bolt 8. In contrast, the second end portion 1B of the drill main body 1 is only elastically deformed by being stretched inwards by the shaft portion 8B of the clamp bolt 8 being threadingly engaged with the threaded portion 9B of the through hole 9 which is formed in the second end portion 1B. Due to this, the pressing forces which are applied when the pair of internal side surfaces 4A of the tip attachment seat 4 press against the respective ones of the pair of outer side surfaces 5A of the tip 5 come to be mutually unequal, which is undesirable.

In other words, since the first end portion 1A which is elastically deformed by the head portion 8A of the clamp bolt 8 so as to be pressed inwards is deformed to a greater amount than is the second end portion 1B which is elastically deformed so as to be pulled inwards by the screwing in of the shaft portion 8B of the clamp bolt 8, thereby the force by which the internal side surface 4A of the tip attachment seat 4 which is positioned on the side of the first end portion 1A, the flexing amount of which is the greater, is pressed against its outer side surface 5A of the tip 5, comes to be greater than the force by which the other internal side surface 4A of the tip attachment seat 4 which is positioned on the side of the other second end portion 1B, the flexing amount of which is the lesser, is pressed against its outer side surface 5A of the tip 5. Due to this, the problem arises that the tip 5 comes to be held by a squeezing force whose strength is inadequate, and the accuracy of deflection of the cutting edge of the tip 5 is deteriorated.

Furthermore, with the above described throw-away tipped drill, although the shifting of the tip 5 which is fitted to the drill main body 1 towards its end is restricted, this is only performed by the frictional force which is generated between the pair of internal side surfaces 4A of the tip attachment seat 4 and the pair of outer side surfaces 5A of the tip 5 due to the clamp bolt 8 being tightened up. Because of this, when for example performing the processing of a workpiece by drilling a deep hole therein, if the hole should become angled or the like, the load which is imposed upon the drill main body 1 becomes great, and, if the space between the first end portion 1A and the second end portion 1B should widen, which is undesirable, then the clamping force for the tip 5 will be deteriorated, and, if the tip 5 should catch against the inner surface of the hole when the throw-away tipped drill is being pulled out from the workpiece, or the like, then it may happen that the tip 5 comes away from the drill main body 1, which is extremely undesirable.

Yet further, with the above described throw-away tipped drill, the pair of raked surfaces 5B which are provided to the tip 5 which is fitted to the tip attachment seat 4 are in a state of opening towards the respective ones of the pair of chip disposal grooves 2. Due to this, when the pair of outer side surfaces 5A of the tip 5 are pressed by the pair of internal side surfaces 4A of the tip attachment seat 4 being mutually brought together by the clamp bolt 8, and thereby the tip 5 is fixedly fitted to the tip attachment seat 4, inevitably the tip 5 is deformed towards the forward rotational direction T (as shown in FIG. 15 by the white arrow signs), which is very undesirable.

Accordingly, it becomes difficult to keep the portions upon the pair of outer side surfaces 5A of the tip 5 which face towards the rearward direction of the rotational direction T of the drill firmly pressed against the pair of internal side surfaces 4A of the tip attachment seat 4, and, as a result, it either simply becomes difficult to hold the tip 5 as strongly fixed in the tip attachment seat 4, or, even if a construction such as the one described above is employed in which the convex portions 7 and the guide grooves 6 are mutually engaged together, the accuracy of positional determination of the tip 5 with respect to the drill main body 1 becomes insufficient.

The present invention has been conceived of in the light of the above described problems, and its primary objective is to provide a throw-away tipped drill in which it is ensured that the pressing force when pressing the pair of outer side surfaces of the tip with the pair of internal side surfaces of the tip attachment seat using the clamp bolt are mutually equal to one another. Furthermore, another objective of the present invention is to provide a throw-away tipped drill, and a tip and a drill main body which are utilized therein, in which coming away of the tip from the drill main body is reliably prevented. Yet another objective of the present invention is to provide a throw-away tipped drill with which it is possible to fit a tip to a concave groove shaped tip attachment seat which opens at an end surface of the drill main body with a clamp bolt in a strong manner. Still another objective of the present invention is to provide a throw-away tipped drill, and a tip and a drill main body which are utilized therein, with which it is possible to prevent the tip from coming away from the drill main body.

SUMMARY OF THE INVENTION

In order to attain the above described objectives, the present invention proposes a throw-away tipped drill, in which a throw-away tip of approximately a flat plate shape, upon an edge of which a cutting edge is formed, is engaged to a concave groove shaped tip attachment seat which opens at an end surface of a drill main body which rotates around an axial line so as to divide the end portion of the drill main body into two portions, so that its pair of outer side surfaces respectively confront a pair of internal side surfaces of the tip attachment seat, and moreover is fitted by a clamp bolt which is inserted into a through hole which is provided at the end portion of the drill main body so as to intersect the tip attachment seat: wherein a slit which extends towards the rear end of the axial line direction is formed upon the bottom surface of the tip attachment seat which faces towards the end of the axial line direction, and, when viewed from the end of the axial line direction, at the end portion of the drill main body which is divided into two by the tip attachment seat, the slit is arranged as being displaced so as to be closer to a portion into which a shaft portion of the clamp bolt is threaded than to a side which is pressed by a head portion of the clamp bolt.

With this throw-away tipped drill, due to the formation of the slit which extends from the bottom surface of the tip attachment seat towards the rear end, when the end portion of the drill which is divided into two by the tip attachment seat is elastically deformed so that the pair of internal side surfaces of the tip attachment seat mutually approach towards one another, the amount of flexing of each of the two end portions of the drill which are thus divided is increased, and the pressing force when pressing the pair of outer side surfaces of the tip with the pair of internal side surfaces of the tip attachment seat is increased.

Furthermore since the slit is arranged so as to be displaced closer, among the end portions of the drill main body which is divided into two by the tip attachment seat, towards that one of those end portions into which the shaft portion of the clamp bolt is screwingly engaged, than towards that one of those end portions which is pressed by the head portion of the clamp bolt, thereby, when the slit is thus narrowed, a difference is created in the cross sectional area of the drill main body which is positioned on both sides, and the end portion on the side which is pressed by the head portion of the clamp bolt is harder to flex than the end portion on the side into which the shaft portion of the clamp bolt is screwingly engaged. Accordingly, it becomes easy to set the flexing of the end portion on the side which is pressed by the head portion of the clamp bolt, which is basically harder to flex, and the flexing of the end portion on the side into which the shaft portion of the clamp bolt is screwingly engaged, which is basically easier to flex, to be approximately mutually equal to one another, and thereby it becomes possible to arrange for the pressing forces, when the pair of outer side surfaces of the tip are pressed by the pair of internal side surfaces of the tip attachment seat which are positioned on the drill main body which is divided into two portions, to be approximately mutually equal to one another. As a result, along with it becoming possible to clamp the tip very strongly, it is also possible to maintain the accuracy of deflection of its cutting edge at an appropriate level.

It should be understood that, with the present invention, it is desirable, when seen from the end of the axial line direction, for the angle of intersection between the direction of extension of the slit and the direction of extension of the clamp bolt is set to be in the range of 90°±15°.

Furthermore, according to another aspect of the present invention, there is proposed a throw-away tipped drill, in which a throw-away tip of approximately a flat plate shape, upon an edge of which a cutting edge is formed, is engaged to a concave groove shaped tip attachment seat which opens at an end surface of a drill main body which rotates around an axial line so as to divide the end portion of the drill main body into two portions, so that its pair of outer side surfaces respectively confront a pair of internal side surfaces of the tip attachment seat, and moreover is fitted by a clamp bolt which is inserted into a through hole which is provided at the end portion of the drill main body so as to intersect the tip attachment seat: wherein, in the region of the throw-away tip which engages with the tip attachment seat, there is provided an inclined portion which extends to the outside of the thickness direction along from the edge towards the rear end side.

With this throw-away tipped drill, the end portion of the drill main body which is divided into two by the tip attachment seat is elastically deformed so as to be pressed inwards by the tightening force of the clamp bolt, and clamps the outer side surface of the tip which is fitted into the tip attachment seat. At this time, since the inclined portion is provided which extends towards the outside of the thickness direction from the edge side facing along towards the rear end in the region of the outer side surface of the tip which is engaged to the tip attachment seat, accordingly the tip attachment seat comes to be in a state in which its edge side juts out more to the inside than to the rear end side. In other words, in this state, the tip attachment seat is elastically deformed into a shape which follows along the inclined portion which is provided upon the outer side surface of the tip, and becomes shaped in a concave groove shape which tapers off as seen from the side. As a result, displacement of the tip towards the edge of the drill main body is restrained, and falling off of the tip from the drill main body is reliably prevented.

With this throw-away tipped drill, it is desirable for, upon each of the outer side surfaces of the throw-away tip which face the tip attachment seat, there to be formed a plurality of convex portions which extend along the direction of the axial line, with the inclined portion being formed in regions between the ridge lines of these convex portions; and, on each of the internal side surfaces of the tip attachment seat, there are formed a plurality of guide grooves which can be engaged with the convex portions, with the inclined portions and the regions which are positioned between the bottom portions of the guide grooves being mutually engaged together.

Furthermore, according to another aspect of the present invention, there is proposed a throw-away tipped drill, in which: a pair of chip disposal grooves are formed on the outer peripheral surface of a drill main body which rotates around an axial line; at an end portion of the drill main body, a concave groove shaped tip attachment seat is formed which, along with connecting to the pair of chip disposal grooves, also opens at an end surface of the drill main body; to the tip attachment seat; a throw-away tip of approximately a flat plate shape, upon an edge of which a pair of cutting edges are formed, is fitted by the pair of internal side surfaces of the tip attachment seat being mutually brought towards one another by a clamp bolt which is screwed into an end portion of the drill main body so that it crosses the tip attachment seat, in such a state that, along with a pair of outer side surfaces of the throw-away tip respectively confronting a pair of internal side surfaces of the tip attachment seat, also, a pair of raked surfaces, which are portions of the pair of outer side surfaces of the throw-away tip which face towards the forward rotational direction of the drill, respectively open into the pair of chip disposal grooves; and: by forming concave portions on the internal side surfaces of the tip attachment seat which do not contact against the outer side surfaces of the throw-away tip, pressure portions are created as remaining adjacent to the concave portions, and are positioned more to the rearward direction of the rotational direction of the drill than the central axial line of the clamp bolt, so that, when the clamp bolt is tightened up, the pressure portions press against the outer side surfaces of the throw-away tipped drill so that the throw-away tip rotates about the axial line while facing towards the rearward direction of the rotational direction of the drill.

With this throw-away tipped drill, when the tip has been fitted to the tip attachment seat by clamping the pair of outer side surfaces of the tip with the pair of internal side surfaces of the tip attachment seat which are mutually brought towards one another by the tightening of the clamp bolt, the pressure portions which are provided upon the internal side surfaces of the tip attachment seat by the formation of the concave portions are pressed against the outer side surfaces of the tip so as to rotate the tip around the axial line facing towards the backward direction of the rotational direction of the drill. Accordingly, even though the pair of raked surfaces of the tip are opened towards the respective ones of the pair of chip disposal grooves, it does not happen that the tip, when fitted to the tip attachment seat, juts out so as to be rotated around the axial line towards the forward direction of the rotational direction of the drill, which would be undesirable. As a result, the portions of the pair of outer side surfaces of the tip which face towards the reverse direction of the rotational direction of the drill are reliably strongly held against the portions of the pair of internal side surfaces of the tip attachment seat which face towards the forward direction of the rotational direction of the drill, and it becomes possible to fit the tip to the tip attachment seat in a strongly fixed manner.

With this throw-away tipped drill, it is desirable for, along with guide grooves which extend along the axial line direction being formed upon portions of the internal side surfaces of the tip attachment seat which face towards the forward direction of the rotational direction of the drill, convex portions which can engage to the guide grooves are formed upon portions of the outer side surfaces of the throw-away tip which face in the rearward direction of the rotational direction of the drill, and moreover these guide grooves and these convex portions are mutually engaged together.

Moreover, with this throw-away tipped drill, a serrated construction is constituted by the convex portions on the tip and the guide grooves on the tip attachment seat which are mutually engaged together. Furthermore, as described above, since the portions of the tip on its pair of outer side surfaces facing the rearward direction of the rotational direction of the drill and the portions of the tip attachment seat on its pair of internal side surfaces facing the forward direction of the rotational direction of the drill are reliably kept in close contact with one another, accordingly it is possible reliably to keep the convex portions and the guide grooves which are formed upon these portions in close contact with one another without any gaps being opened up between them. As a result, it is possible to enhance the accuracy of position determination of the tip with respect to the main body of the drill.

Furthermore, according to another of its aspects, the present invention proposes a throw-away tip which is fitted to a throw-away tipped drill of the present invention as described above, wherein, in its region which engages with the tip attachment seat, an inclined portion is provided which extends to the outside of the thickness direction along from the edge towards the rear end side.

For this tip, it is desirable for the gradient of the inclined portion to be from 0°01' to 3°. If this gradient is less than 0°01', then the amount of deformation of the end portion of the drill main body becomes small, and the force to hold the tip in place becomes insufficient, which is undesirable. On the other hand, if this gradient is greater than 3°, then the inclination of the inclined portion is too severe, and the deformation of the drill main body does not follow it, so that the degree of close fitting together of the drill main body and the tip becomes inadequate, and the force to hold the tip in place is undesirably deteriorated. Due to this, it is considered to be desirable for this gradient to be set within the range of from 0°01' to 3°.

Furthermore, with this tip, it is desirable for, upon the outer side surface, there to be formed a plurality of convex portions which, along with extending along the axial line direction, also engage with the tip attachment seat of the drill main body, and for the inclined portions to be provided in regions which are positioned between the ridge lines of these convex portions.

Yet further, according to yet another of its aspects, the present invention proposes a drill main body which is used in a throw-away tipped drill according to the present invention as described above, wherein, upon the bottom surface of the tip attachment seat which faces towards the end of the axial line direction, there is cut a slit which extends towards the rear end of the axial line direction.

With this drill main body, by forming the slit upon the bottom surface of the tip attachment seat of the drill main body, elastic deformation of the end portion of the drill main body becomes easy, so that it is possible easily and reliably to perform fitting of the tip to the drill main body.

BRIEF DESCRIPTION OF THE DRAWINGS

FIG. 15 is an end-on view showing an example of a prior art throw-away tipped drill.

FIG. 16 is a cross cross-sectional view showing an example of a prior art throw-away tipped drill.

DETAILED DESCRIPTION OF THE INVENTION

Figure 1:
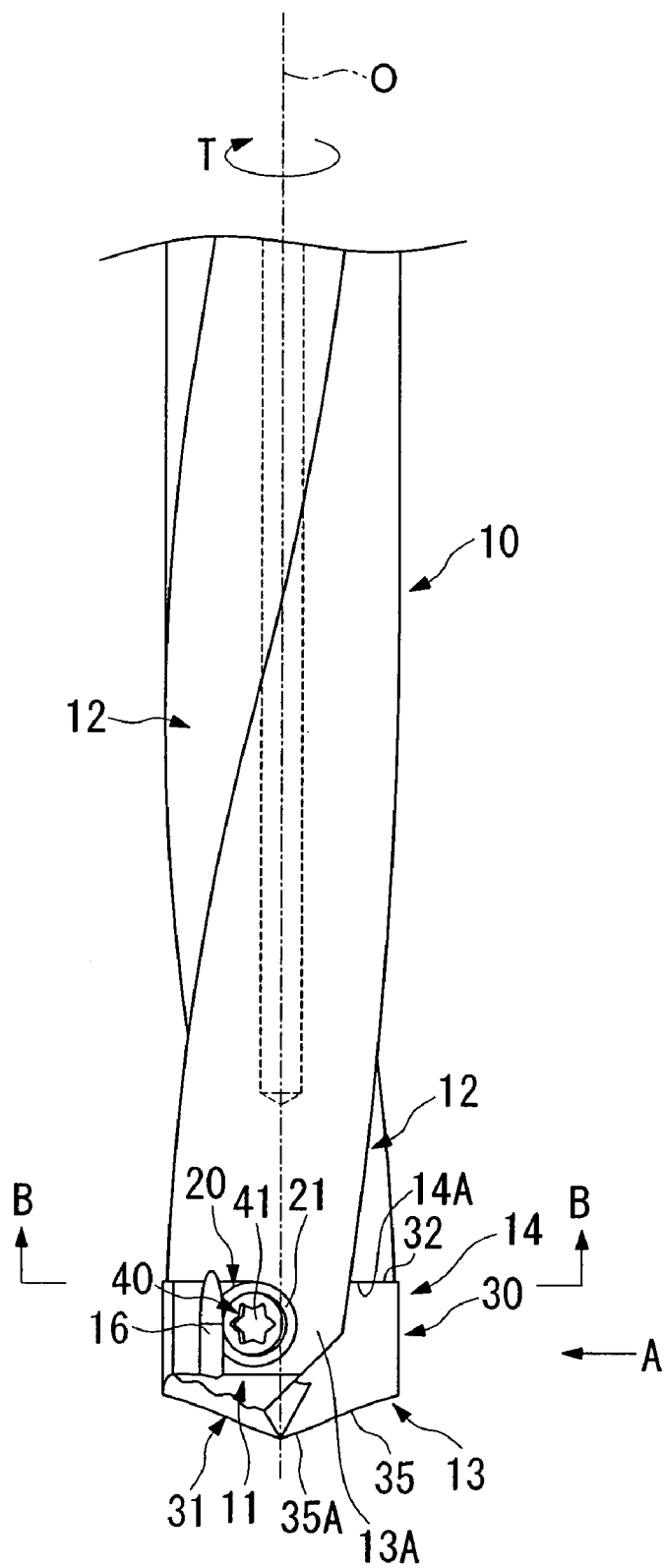
FIG. 1 is an elevation view of a throw-away tipped drill, showing an embodiment of the present invention.

In the following, several preferred embodiments of the present invention will be explained with reference to the appended drawings.

The first embodiment of the present invention is shown in FIGS. 1 through 5.

A drill main body 10 of a throw-away drill according to this first embodiment of the present invention is reduced in radius with respect to a shank portion (not shown in the figures) which is formed integrally at its rear end, and, as a whole, defines a multi-stage columnar shape around an axial line O as a central axis when rotated around this axial line O.

At the outer periphery of the side end portion of this drill main body 10, a pair of chip disposal grooves 12, which open into an end surface 11 of the drill main body 12 on mutually opposite sides sandwiching the axial line O, are formed in the form of spirals which screw along the sides of the drill main body 10 towards the rear as the drill is rotated around the axial line O in its prescribed rotational direction T.

Furthermore, at the end portion 13 of the drill main body 10, a concave groove shaped tip attachment seat 14 is cut into the end of the drill main body 10 so as to open into the end surface 11, and this tip attachment seat 14 is formed so as to extend along the diametrical direction of the drill main body 10.

Figure 3:
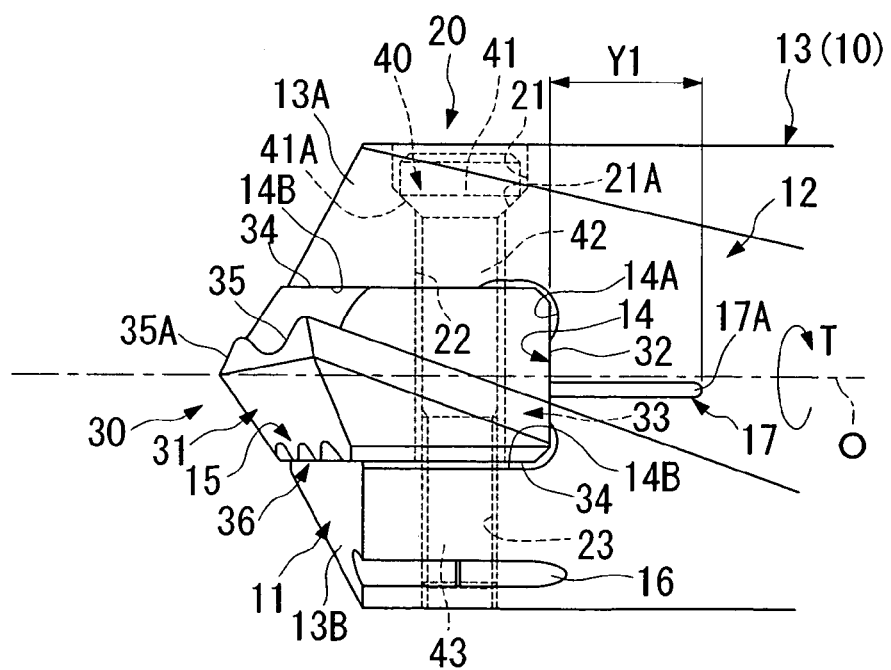
FIG. 3 is a side view of the end of this drill as seen along the direction of an arrow A in FIG. 1.

This tip attachment seat 14 comprises a bottom surface 14A which extends perpendicular to the axial line O toward the end side of the axial line O direction, and a pair of internal side surfaces 14B which, along with standing up from this bottom surface 14a, rise up mutually parallel to one another and moreover parallel to the axial line O, and finally intersect the end surface 11 of the drill main body 10; and, as shown in FIG. 3, when seen from the side surface along the bottom surface 14A and the internal side surfaces 14B, it opens in the shape of a letter "C" towards the end surface 11 of the drill main body 10.

In more detail, this tip attachment seat 14 is formed at the end portion 13 of the drill main body 10 by cutting out, along the diametrical direction of the drill main body 10, surfaces at the end portions of the chip disposal grooves 12 which face towards the forward side of the rotational direction T of the drill, and, at both their end side portions in their direction of extension M (i.e., in the above described radial direction), these connect to the respective chip disposal grooves 12.

In other words, with respect to the pair of external peripheral side end portions which are positioned at both its ends in the direction of extension M of the bottom surface 14A respectively and which face to the outer peripheral surface of the drill main body 10, among the pair of external peripheral side end portions of the pair of internal side surfaces 14B which are positioned at both end sides of this direction of extension M, only that one of these external peripheral side end portions which faces to the forward side of the rotational direction T of the drill faces to the outer peripheral surface of the drill main body, while the other external peripheral side end portion does not reach the external peripheral surface of the drill main body 10, but faces the wall surface of the chip disposal groove 12 which faces toward the reverse direction to the rotational direction T of the drill.

Furthermore, by the concave groove shaped tip attachment seat 14 being formed at the end portion 13 of the drill main body 10, this end portion 13 of the drill main body 10 is divided into two portions, a first end portion 13A and a second end portion 13B, and the bottom surface 14A of the tip attachment seat 14 is positioned between this first end portion 13A and this second end portion 13B, and moreover a one among the pair of the internal side surfaces 14B of the tip attachment seat 14 is positioned on the side of the first end portion 13A, while the other one among the pair of the internal side surfaces 14B of the tip attachment seat 14 is positioned on the side of the second end portion 13B.

Figure 4:
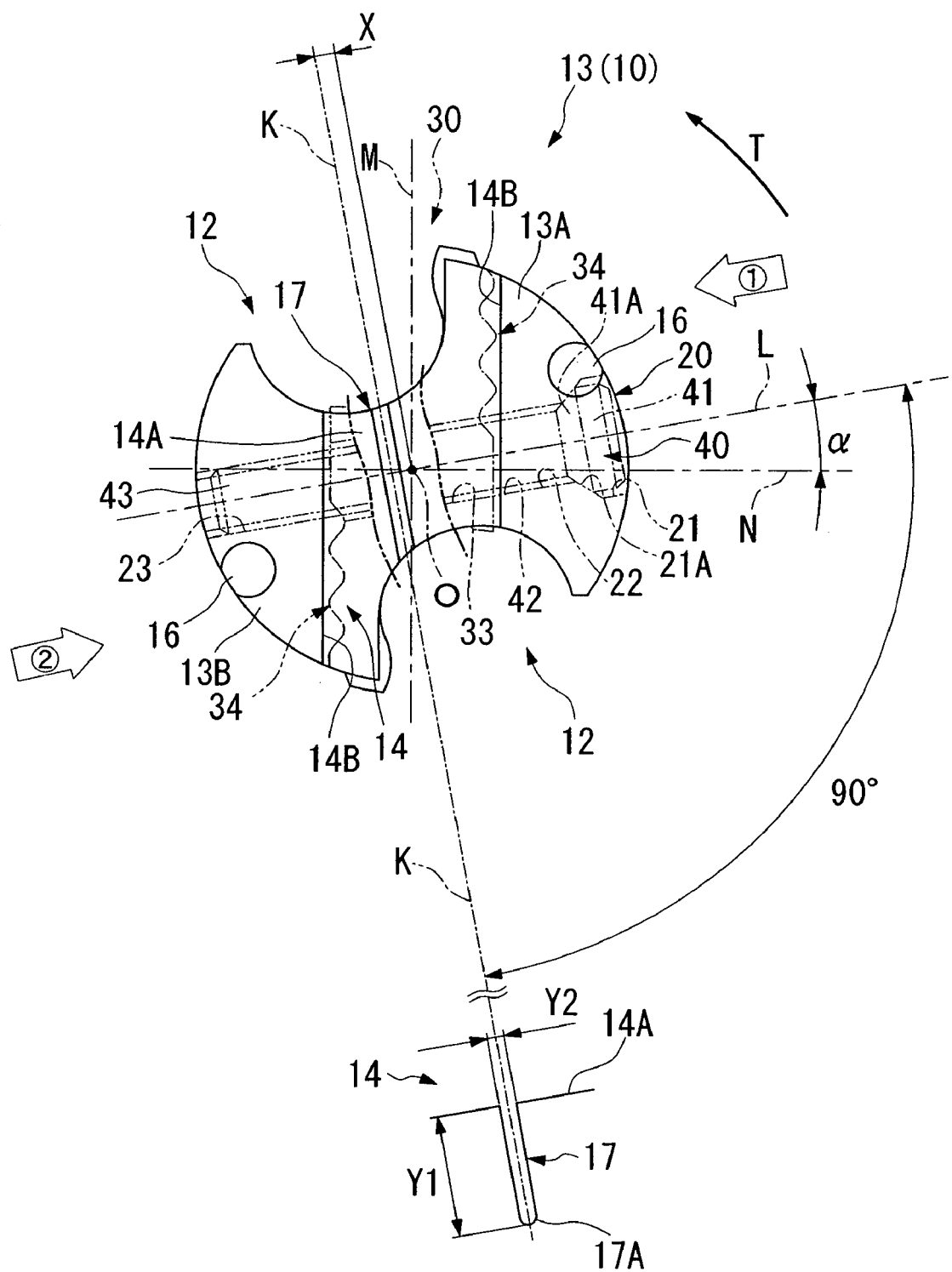
FIG. 4 is a cross-sectional view of the end of this drill as seen in a sectional plane shown by the arrows B—B in FIG. 1.

A through hole 20 is provided on the end portion 13 of the drill main body, and, as shown in FIGS. 3 and 4, this extends in the diametrical direction of the drill main body 10, perpendicularly to the tip attachment seat 14. This through hole 20 pierces through the end portion 13, and its ends in its direction of extension L open respectively to the outer peripheral surface of the first end portion 13A and to the outer peripheral surface of the second end portion 13B.

Although the through hole 20, just like the tip attachment seat 14, is formed so as to extend in the diametrical direction of the drill main body 10, as shown in FIG. 4, its direction of extension L is not parallel to the direction (the widthwise direction N of the tip attachment seat 14) perpendicular to the direction of extension M of the tip attachment seat M as seen along the direction of the axial line O, but, rather, is tilted by a predetermined angle with respect to the widthwise direction N of the tip attachment seat 14. In other words, the through hole 20 is formed so that, as seen along the direction of the axial line O, its direction of extension L is tilted by an angle $\alpha$ ($0° < \alpha \leq 30°$) to face towards the forward side of the rotational direction T of the drill with respect to the widthwise direction N of the tip attachment seat 14 which passes through the axial line O (i.e., the difference angle $\alpha$ which the direction of extension L of the through hole 20 and the widthwise direction of the tip attachment seat 14 subtend is set within the range of $0° < \alpha \leq 30°$).

The portion of the through hole 20 which is positioned within the first end portion 13A consists of a concave portion 21 which is hollowed out from the outer peripheral surface of the first end portion 13A towards the axial line O at a constant internal diameter, and a hole portion 22 which connects to this concave portion 21 and extends towards the axial line O at a constant internal diameter which is smaller than the internal diameter of the concave portion 21, then opening to the internal side surface 14B of the tip attachment seat 14; and the portion which connects together this concave portion 21 and this hole portion 22 is made as a tapered surface 21A, the internal diameter of which is gradually radially reduced towards the axial line O.

Furthermore, the portion of the through hole 20 which is positioned within the second end portion 13B consists of a threaded portion 23 which extends from the outer peripheral surface of the second end portion 13B towards the axial line O at a constant internal diameter, and opens to the internal side surface 14B of the tip attachment seat 14. However, it would also be acceptable for the portion of the through hole 20 which is positioned within the second end portion 13B not to open to the outer peripheral surface of the second end portion 13B.

Furthermore, in this embodiment of the present invention, a slit 17 is formed in the bottom surface 14A of the tip attachment seat 14 which faces the end of the drill along the axial line O, so that, in its depth dimension, this slit 17 lies parallel to the axial line O and extends towards the rear of the drill main body in the direction of the axial line O. Each of the ends of this slit 17 in its direction of extension K (i.e., the direction in which the slit 17 extends when seen from the end of the drill along the direction of the axial line O) opens into the wall surface of the corresponding one of the chip disposal grooves 12, and, as a result, the slit 17 is communicated to these chip disposal grooves 12.

As shown in FIG. 4, when seen from the end of the drill along the axial line O, the slit 17 does not extend exactly along the diametrical direction of the drill main body 10, but rather is arranged to deviate by just a prescribed amount of deviation X from the axial line O so as to approach closer to the second end portion 13B than to the first end portion 13A; in other words, the distance between the direction of extension of the slit 17 (exactly, a line which extends along the direction of extension of the slit 17 along the central portion of the slit 17 in the widthwise direction) and the axial line O is this amount of deviation X.

Furthermore, as shown in FIG. 4, as seen from the end of the drill along the axial line O, the angle of intersection between the direction of extension K of the slit 17 and the direction of extension L of the through hole 20 (i.e. the direction of extension of a clamp bolt 40 which is inserted through this through hole 20 and which will be described hereinafter) is set to be approximately 90°.

Furthermore, the bottom portion 17A of the slit 17 is made so as to describe, in cross section, a semicircular arc shape, thus being concave facing along the axial line O towards the bottom end of the drill, so as to connect together smoothly the pair of both the wall surfaces which constitute this slit 17 and which mutually confront one another.

In addition, the depth Y1 of the slit 17 (the distance along the direction of the axial line O from the bottom surface 14A of the tip attachment seat 14 to the bottom portion 17A of the slit 17) is set to be within the range 3 mm~15 mm, while the width Y2 of the slit 17 (the distance between the pair of mutually confronting wall surfaces which define the slit 17 along the direction perpendicular to the direction of extension K of the slit 17) is set to be within the range 0.1 mm~1 mm.

Thinning surfaces 31A of a tip 30 which will be described hereinafter and main body side thinning surfaces 11A which link thereto are formed on the end surface 11 of the drill main body 10, so as to cut gaps in the intersection ridge line portion between the end surface 11 and the wall surfaces of the chip disposal grooves 12 which face to the rear side of the rotational direction T of the drill. Furthermore, the pair of internal side surfaces 14B of the tip attachment seat 14 which intersect with the end surface 11 of the drill main body 10 also intersect with these main body side thinning surfaces 11A.

Furthermore, a plurality of guide grooves 15 which extend along the direction of the axial line O are formed upon each of the pair of internal side surfaces 14B of the tip attachment seat 14, so as to be arranged with a predetermined spacing between them along a direction which is perpendicular to the axial line O. On the other hand, on each of this pair of internal side surfaces 14B, these guide grooves 15 are not formed upon their portions which extend up to the main body side thinning surfaces 11A (the portions where their edges intersect with the thinning surfaces 11A on the main tip side), but rather these portions are formed as planar surfaces.

In other words, the guide grooves 15 are formed over the regions upon the pair of internal side surfaces 14B of the tip attachment seat 14 except for the portions which extend up to the after edge sides of the main body side thinning surfaces 11A (which are positioned in the vicinity of the axial line O); that is, they are positioned on the regions of the pair of internal side surfaces 14B at the outer peripheral surface of the drill main body 10, and moreover, are formed upon the regions thereof which face the forward side of the rotational direction T of the drill.

Figure 2:
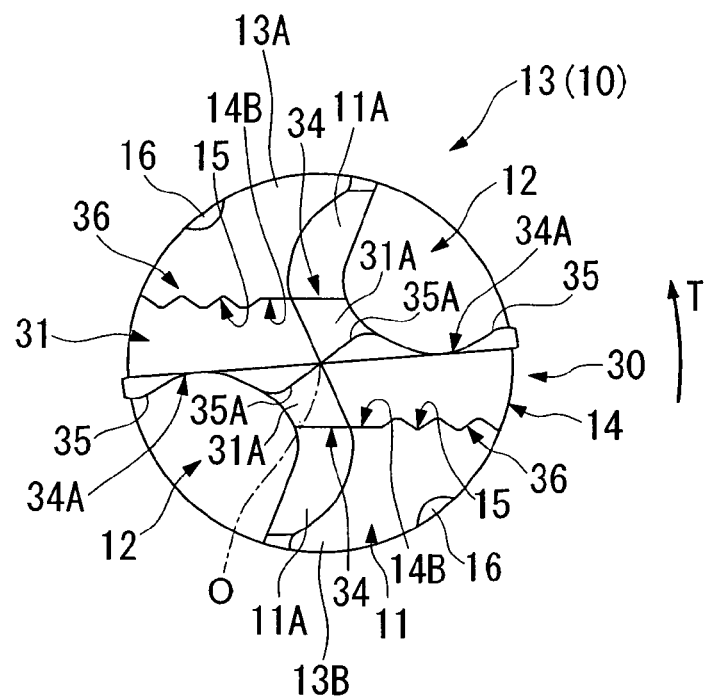
FIG. 2 is an end-on view of the throw-away tipped drill of FIG. 1.

As a result, as shown in FIG. 2, when the drill main body 10 is seen from the end of the drill along the direction of the axial line O, the intersection ridge line portions between the pair of internal side surfaces 14B and the main body side thinning surfaces 11A describe respective straight lines, and moreover the intersection ridge line portions between the pair of internal side surfaces 14B and the end surface 11 (with the exception of the main body side thinning surfaces 11A) describe wavy forms according to the shapes of the guide grooves 15.

It should be understood that, by cutting away the outer peripheral surface of the drill main body 10 between the pair of chip disposal grooves 12 at the end portion 13 of the drill main body 10, a pair of coolant discharge portions 16 are formed as extending along the axial line O from the end of the drill main body 10, with the ends of coolant holes (not shown in the figures) branching to partway along these coolant discharge portions 16; and, during the process of utilizing this drill for drilling a hole, coolant is supplied via these coolant discharge portions 16 to the cutting position.

Figure 5:
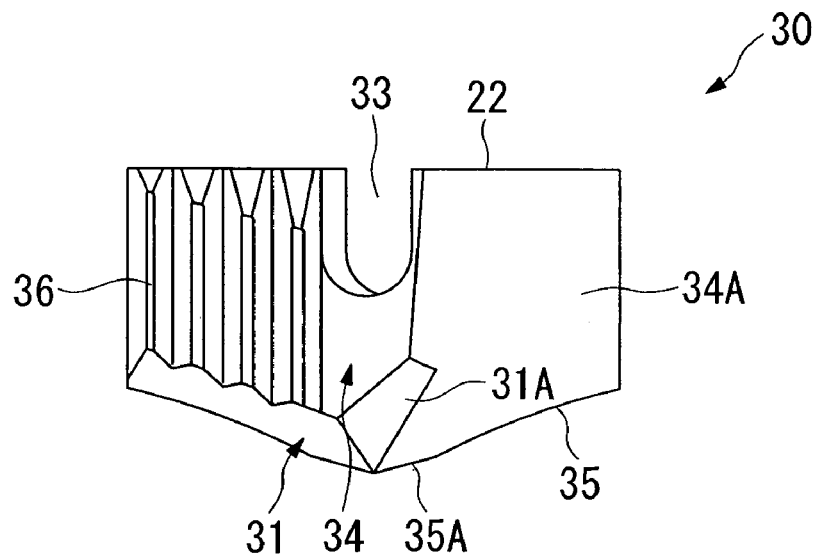
FIG. 5 is a side view showing an example of a tip which is attached to the throw-away tipped drill of the present invention.

On the other hand, a tip 30 which is fitted to the tip attachment seat 14 is formed as an approximately flat plate from a hard material such as cemented carbide or the like, in the shape of an irregular pentagon, as shown in FIG. 5. Furthermore, a cutaway portion 33 into which a clamp bolt 40 which will be described hereinafter is inserted is formed by cutting away a portion thereof from roughly its middle portion up to its rear edge face 32, so as to be inclined with respect to the thickness direction of the tip 30.

When the tip 30 is fitted to the tip attachment seat 14, the end surface 31 of the tip 30 describes an isosceles triangular shape (a letter "V" shape) so as to gradually retreat from the axial line O around the circumferential direction. Respective cutting edges 35 are formed upon the intersection ridge line portions of these end surfaces 31, and the pair of outer side surfaces 34 of the tip 30, and the raked surfaces 34A which face in the forward rotational direction T of the drill.

Furthermore, at the end surface 31 of the tip 30, when the tip 30 has been fitted to the tip attachment seat 14, from the vicinity of the axial line O which is positioned at the center of the end surface 31, among the pair of outer side surfaces 34, the pair of thinning surfaces 31A which are positioned on mutually opposite sides of the axial line O, sandwiching it between them, are formed by cutting away the region up to the portion where the raked surface 34A and the other portion intersect one another. Furthermore, the thinning cutting edge portions 35A which extend from the inner peripheries of the cutting edges 35 towards the center of the end surface 31 (the axial line O) are formed at the intersection ridge line portion between the pair of thinning surfaces 31A and the end surface 31.

Furthermore, a plurality of convex portions 36 upon each of the raked surfaces 34A of the pair of outer side surfaces 34 and the portions on the opposite side which extend along the direction of the axial line O when the tip 30 is fitted to the tip attachment seat 14 are formed so as to be arranged at predetermined intervals in a direction perpendicular to the axial line O. On the other hand, upon the portions upon this pair of outer side surfaces 34 other than the raked surfaces 34A, at the portions which extend to the thinning surfaces 31A (their portions where the edge sides intersect with the thinning surfaces 31A), they are made in a planar form without the formation of any such convex portions 36.

In other words, in the pair of outer side surfaces 34 of the tip 30, the convex portions 36 are positioned to the opposite side from the raked surfaces 34A, and moreover they are formed in the regions which exclude the portions which extend to the rear end sides of the thinning surfaces 31A (positions in the vicinity of the axial line O when the tip 30 is fitted to the tip attachment seat 14); i.e., they are formed in regions, within the pair of internal side surfaces 34, which are positioned at the outer peripheral side of the drill main body 10 and which face to the rearward side of the rotational direction T of the drill.

As a result, when the tip 30 which has been fitted to the tip attachment seat 14 is viewed from the direction of the end of the axial line O, as shown in FIG. 2, in the pair of outer side surfaces 34, each of the intersection ridge line portions between the raked surfaces 34A and the thinning surfaces 31A describes a straight line, and moreover, in the pair of outer side surfaces 34, the intersection ridge line portions between the portions other than the raked surfaces 34A and the end surfaces 31 with the exception of the thinning surfaces 31A describe wavy shapes according to the shapes of the convex portions 36.

The tip 30 which has this type of construction is inserted into the concave groove shaped tip attachment seat 14 which has been formed at the end portion of the drill main body 10 by being slid towards the base of the drill in the direction of the axial line O, in the state in which the thickness direction of the tip 30 is set to be parallel with respect to the widthwise direction N of the tip attachment seat 14 (the direction which is perpendicular to the direction of extension M of the tip attachment seat 14). Furthermore, when inserting this tip 30, the convex portion 36 which are formed upon the outer side surface of the tip 30 are engaged with the guide grooves 15 which are formed upon the internal side surfaces 14B of the tip attachment seat 14.

As a result, the rear end surface 32 of the tip 30 is closely contacted with and against the bottom surface 14A of the tip attachment seat 14. Furthermore, along with the raked surfaces 34A upon the outer side surfaces 34 of the tip 30 opening to face the respective chip disposal grooves 12 and to face the forward side of the rotational direction T of the drill, also the portions of the outer side surfaces 34 of the tip 30 other than the raked surfaces 34A confront the respective internal side surfaces 14B of the tip attachment seat 14.

In this case, in the portions of the outer side surfaces 34 of the tip 30 other than the raked surfaces 34A, the portions upon which the plurality of convex portions 36 are formed oppose the portions of the internal side surfaces 14B of the tip attachment seat 14 upon which the plurality of guide grooves 15 are formed in the state in which the convex portions 36 and the guide grooves 15 are mutually engaged together. Furthermore, along with the planar surface shaped portions in the portions of the outer side surfaces 34 of the tip 30 other than the raked surfaces 34A which extend to the rear end sides of the thinning surfaces 31A confronting the planar surface shaped portions which extend to the rear end sides of the main body side thinning surfaces 11A of the internal side surfaces 14B of the tip attachment seat 14, the thinning surfaces 31A which extend to the edge sides of these planar surface shaped portions and the main body side thinning surfaces 11A form a connected surface.

And a clamp bolt 40 is inserted into the through hole 20 which is provided at the end portion 13 of the drill main body 10 and which intersects the tip attachment seat 14 so as to be inclined at an angle with respect to its widthwise direction N, so as to pass through the cutaway portion 33 of the tip 30 which has been inserted into the tip attachment seat 14, into the outer peripheral surface of the first end portion 13A of the through hole 20 from its opening portion.

This clamp bolt 40 is made in a multi-stage columnar shape, and comprises a head portion 41 positioned at its aft end which is formed in a roughly columnar shape and has a constant external diameter, and a shaft portion 42 which extends to the end of this head portion 41 and has a roughly columnar shape having a constant external diameter which is smaller than the external diameter of the head portion 41, and upon the side of which, furthermore, a threaded portion 43 is formed. Furthermore, the connection portion between the head portion 41 and the shaft portion 42 is formed as a taper surface 41A by gradually reducing the outer diameter of the head portion 41 in the direction of the end of the bolt 40.

The clamp bolt 40 is inserted into the through hole 20 as described above, and the threaded portion 43 which is formed upon the shaft portion 42 of this clamp bolt 40 is screwingly engaged with the threaded portion 23 which is formed in the through hole 20. And, when the head portion 41 is received within the concave portion 21 of the through hole 20, the taper surface 41A of the head portion 41 and the taper surface 21A of the concave portion 21 come into mutual contact with one another.

In this case, by screwing the threaded portion 43 into the threaded portion 23, the taper surface 41A is pressed closely against the taper surface 21A, and, along with the force which is thereby generated acting to pull the taper surface 21A towards the axial line O, also the threaded portion 43 which is screwed into the threaded portion 23 generates a force which acts so as to pull the threaded portion 23 towards the axial line O.

Accordingly, the first end portion 13A upon which the concave portion 21 is internally formed as shown by the arrow sign (1) in FIG. 4, and the second end portion 13B upon which the threaded portion 23 is internally formed as shown by the arrow sign (2) in FIG. 4, are both elastically deformed so as to approach towards the axial line O and so as to mutually approach one another. As a result, along with the pair of internal side surfaces 14B of the tip attachment seat 14 respectively pressing firmly against the pair of outer side surfaces 34 of the tip 30, the portions 36 and the guide grooves 15 which are mutually engaged together convex are also firmly pressed together, and thereby the tip 30 is fitted to the tip attachment seat 14.

Furthermore, as described above, with the throw-away tipped drill according to this first embodiment of the present invention, the slit 17 is formed in the bottom surface 14A of the tip attachment seat 14. Due to this, when the first end portion 13A and the second end portion 13B of the drill main body 10 are elastically deformed by the clamp bolt 40 so that the pair of internal side surfaces 14B of the tip attachment seat 14 mutually approach towards one another, the bottom portion 17A of this slit 17 becomes the fulcrum as these first end portion 13A and second end portion 13B are elastically deformed.

Accordingly, by comparison with the case in which no such slit 17 is formed, the fulcrum when the first end portion 13A and the second end portion 13B are elastically deformed is displaced towards the rear of the drill along the direction of the axial line O. As a result, by sufficiently increasing the amount of deformation of this first end portion 13A and this second end portion 13B, it is possible to increase the pressing force when pressing the outer side surfaces 34 of the tip 30 by the internal side surfaces 14B of the tip attachment seat 14.

Furthermore, since the direction of extension K of the slit 17 intersects with the direction of extension L of the through hole 20 (the direction of extension of the clamp bolt 40) at an angle which is approximately 90°, thereby, when the first end portion 13A and the second end portion 13B are both elastically deformed towards the axial line O by the clamp bolt 40, this first end portion 13A and this second end portion 13B are easily elastically deformed, and the pressing force when pressing the outer side surfaces 34 of the tip 30 with the internal side surfaces 14B of the tip attachment seat 14 is further increased.

Figure 6A:
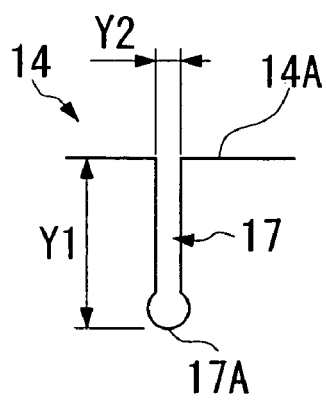
FIG. 6A is a magnified schematic explanatory figure showing a modified embodiment of a slit of this throw-away tipped drill according to the embodiment of the present invention.
Figure 6B:
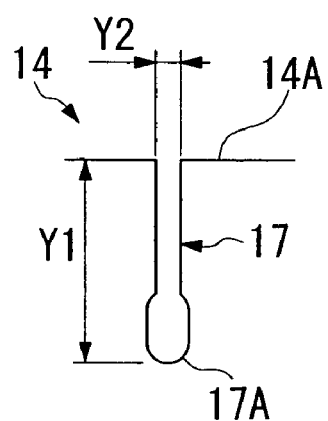
FIG. 6B is another magnified schematic explanatory figure showing another modified embodiment of this slit of the throw-away tipped drill according to the embodiment of the present invention.

Yet further, since the cross section of the bottom portion 17A of the slit 17 is arranged to be a semicircular arc shape which faces concavely towards the tip of the drill along the direction of the axial line O, accordingly it becomes possible to alleviate the concentration of reaction force which is created when the first end portion 13A and the second end portion 13B are elastically deformed by the clamp bolt 40. It should be understood that, as a cross sectional shape for the bottom portion 17A of the slit 17 which can alleviate this concentration of reaction force, the present invention is not to be considered as being limited to the use of a semicircular arc shape; various types of form might be considered, such as, for example, as shown in FIG. 6A, a circular shape having a greater width than the width Y2 of the slit 17 (the length of the slit 17 along the direction which is perpendicular to its direction of extension K), or, as shown in FIG. 6B, an elliptical shape similarly having a greater width than the width Y2 of the slit 17, or the like; but, in either of these cases, it is desirable for the width of the bottom portion 17A to be set to less than or equal to 5 mm.

Even further, by setting the depth Y1 of the slit 17 in the range from 3 mm to 15 mm, and by setting the width Y2 of the slit 17 in the range from 0.1 mm to 1 mm, and moreover by forming the slit 17 in the appropriate shape, and by increasing the respective amounts of digging out of the first end portion 13A and of the second end portion 13B, no inconvenience is caused such as deterioration of the rigidity of the drill main body 10, or the like, even while it is possible sufficiently to enhance the pressing force when pressing the outer side surfaces 34 of the tip 30 with the internal side surfaces 14B of the tip attachment seat 14.

Furthermore, in this embodiment of the present invention, the slit 17, as seen from the direction of the end of the axial line O, is arranged to have just an amount of deviation X from the axial line O so that it approaches closer to the second end portion 13B than to the first end portion 13A. Accordingly, with regard to the cross sectional area in a cross section perpendicular to the axial line O of the drill main body 10 which are positioned on both sides of the slit 17 and sandwiching it, the cross sectional area of that portion which is positioned to the side of the first end portion 13A is greater than the cross sectional area of that portion which is positioned to the side of the second end portion 13B.

As a result, when the first end portion 13A is pressed with the head portion 41 of the clamp bolt 40 and is elastically deformed so as to be pressed inwards towards the axial line O, the first end portion 13A which is basically relatively greatly flexed becomes relatively difficult to be flexed; while, when at the same time, the second end portion 13B is pulled by the mutually engagement together of the threaded portions 23 and 43 and is elastically deformed towards the axial line O, the second end portion 13B which is basically relatively difficult to be flexed becomes relatively greatly flexed. Accordingly, it becomes possible to set the amounts of flexing of this first end portion 13A and this second end portion 13B to be roughly equal to one another.

Due to this, when the pair of outer side surfaces 34 of the tip 30 are pressed by the internal side surface 14B of the tip attachment seat which is positioned on the side of the first end portion 13A and by the internal side surface 14B of the tip attachment seat which is positioned on the side of the second end portion 13B, the pressing forces are mutually equal to one another, and the tip 30 is firmly squeezed and held to the tip attachment seat 14, so that it is possible to keep its cutting edge deflection accuracy at a high level.

Here, the amount of deviation X of the slit 17 is adjusted in an appropriate manner, according to various shapes for the throw-away tipped drill, so as to be able to set the amount of flexing of the first end portion 13A and the amount of flexing of the second end portion 13B so as to be approximately equal to one another. For example, if the depth of the slit 17 is 5 mm and its width is 0.7 mm, then, when the outer diameter D of the cutting edge 35 (the outer diameter which is described by the rotational orbit around the axial line O of the cutting edge 35) is 15 mm, it is desirable for the amount of deviation X to be set to about 0.5 mm. Furthermore, when the outer diameter D of the cutting edge 35 is 25 mm, it is desirable for the amount of deviation X to be set to about 0.8 mm. The appropriate amount of deviation X of the slit 17 becomes greater almost in proportion to increase in the outer diameter D of the cutting edge 35. For example, it becomes easy to set the amount of flexing of the first end portion 13A and the amount of flexing of the second end portion 13B so as to be approximately equal to one another by setting the amount of deviation X appropriately in the range of 1% to 10% (and desirably from 1% to 5%) with respect to the outer diameter D of the cutting edge 35 (in the above example, the amount of deviation X of the slit 17 was set to about 3% of the outer diameter D of the cutting edge 35).

Furthermore, with the throw-away tipped drill according to this embodiment of the present invention, it becomes possible easily to fit the tip 30 to the tip attachment seat 14, simply by inserting and sliding the tip 30 with respect to the tip attachment seat 14 towards the rear of the drill along the direction of the axial line O, along with engaging the plurality of convex portions 36 which are formed upon the outer side surfaces 34 of the tip 30 with the plurality of guide grooves 15 which are formed upon the internal side surfaces 14B of the tip attachment seat 14 and which extend along the direction of the axial line O.

Yet further, it is possible to enhance the accuracy of positional setting of the tip 30 with respect to the tip attachment seat 14 of the drill main body 10 as a result of forming this serrated construction in which together these convex portions 36 and these guide grooves 15 are mutually engaged together, and thereby it is possible to maintain the desirable accuracy when processing a workpiece with this drill.

In addition, by forming a serration construction such as that described above, it is possible to obtain the beneficial effects that the contact area between the tip 30 and the tip attachment seat 14 is increased, and that thereby the fitting rigidity of the tip 30 is enhanced, so that, when performing the task of drilling a hole in a workpiece by rotating the drill main body 10 around the axial line O, the beneficial effect is obtained that positional deviation of the tip 30 is suppressed, so that it is possible reliably to transmit the rotational force of the drill main body 10 at high efficiency.

Furthermore, with this embodiment of the present invention, the portions of the outer side surfaces 34 of the tip 30 which extend to the rear side of the thinning surface 31A are shaped as planar surfaces, and moreover the portions of the internal side surfaces 14B of the tip attachment seat 14 which extend to the rear side of the thinning surface 31A are also shaped as planar surfaces. Due to this, the connection portions between the thinning surface 31A of the tip 30 and the main body side thinning surface 11A of the drill main body 10 form straight lines when seen from the end side, and the serration construction of wavelike form which is constituted by the mutual engagement together of the convex portions 36 and the guide grooves 15 does not appear at the connection portion between the thinning surface 31A and the main body side thinning surface 11A.

Accordingly, when performing the process of drilling a hole, it is difficult for the phenomenon to occur that the chip which is generated at the thinning cutting edge portion 35 becomes caught upon the connection portion between the thinning surface 31A and the main body side thinning surface 11A during the process of flowing out from the thinning surface 31A via the main body side thinning surface 11A. As a result, abrasion between the chip and the drill main body 10 is discouraged, so that the chip ejection characteristic is maintained as being excellent.

It should be understood that although, with this embodiment of the present invention, when seen from the end of the axial line O, the angle of intersection between the direction of extension K of the slit 17 and the direction of extension L of the through hole 20 (the direction of extension of the clamp bolt 40) is set to be approximately 90°, this angle of intersection is not to be considered as being limited to this value. For example, as in the modified embodiment shown in FIG. 7 or in the modified embodiment shown in FIG. 8, it would also be acceptable for this angle of intersection between the direction of extension K of the slit 17 and the direction of extension L of the through hole 20 to be set within a range of 90°±15°.

Figure 7:
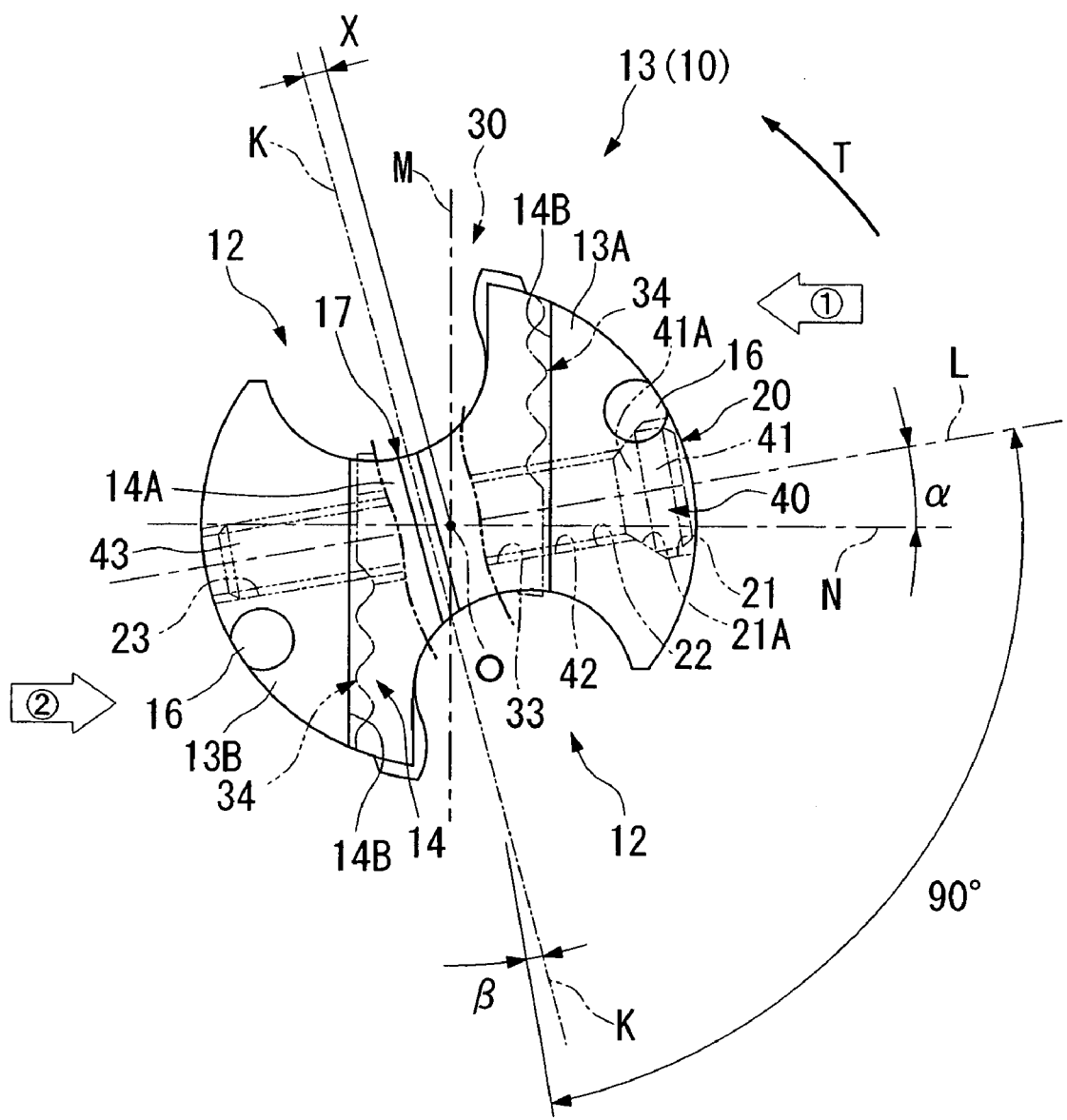
FIG. 7 is a cross-sectional view showing a modified embodiment of the throw-away tipped drill of the embodiment of the present invention.

In the embodiment shown in FIG. 7, the slit 17 is formed so that, when seen from the end of the axial line O, the angle of intersection between the direction of extension K of the slit 17 and a line drawn at 90° from the direction of extension L of the through hole 20 (the direction of extension of the clamp bolt 40) is just an angle of β (where 0°<β≦15°), with the direction of extension of the slit 17 being towards the rotational direction T of the drill, i.e. to its forward side.

With this embodiment of the present invention, since the direction of extension K of the slit 17 is inclined as described above, when the first end portion 13A and the second end portion 13B are elastically deformed by the clamp bolt 40, the first end portion 13A, as shown in an exaggerated manner by the arrow sign (1) in FIG. 7, and furthermore the second end portion 13B, as shown in an exaggerated manner by the arrow sign (2) in FIG. 7, are elastically deformed so as to mutually approach together towards the axial line O, while being respectively, inclined towards the forward side of the rotational direction T of the drill.

Due to this, the internal side surfaces 14B of the tip attachment seat 14 become capable of pressing against the outer side surfaces 34 of the tip 30 almost along the widthwise direction N of the tip attachment seat 14. The result of this, also due to making reliable and also strong close contact with the convex portions 36 and the guide grooves 15, is that the beneficial result is obtained that it is possible desirably to ensure the cutting edge deflection accuracy of the tip 30.

Figure 8:
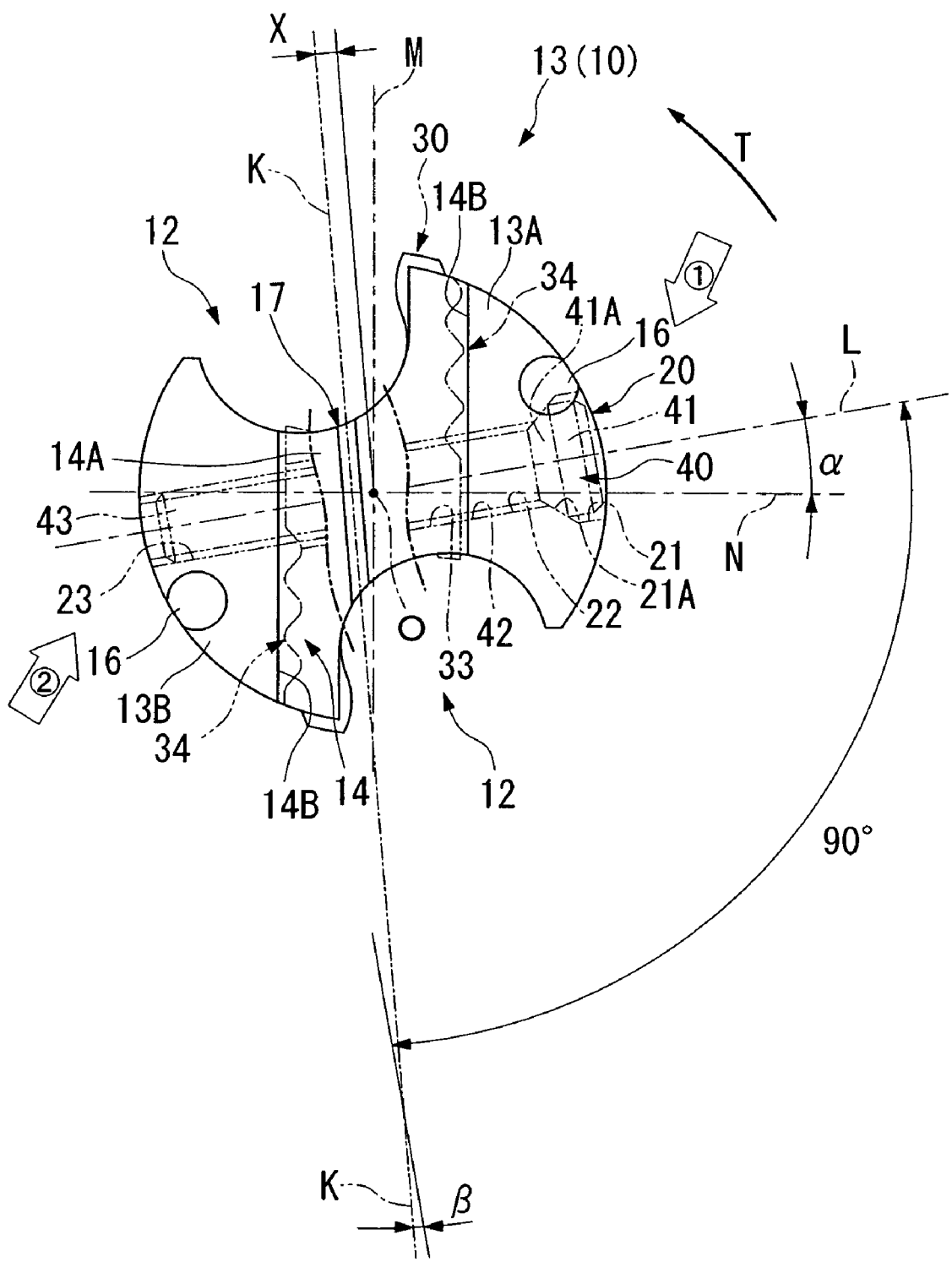
FIG. 8 is another cross-sectional view showing a modified embodiment of the throw-away tipped drill of the embodiment of the present invention.

In the embodiment shown in FIG. 8, the slit 17 is formed so that, when seen from the end of the direction of the axial line O, the angle of intersection between the direction of extension K of the slit 17 and the direction of extension L of the through hole 20 (the direction of extension of the clamp bolt 40) is inclined from 90° by just an angle β (where 0°<β≦15°), with the direction of extension K of the slit 17 being towards the rearward side of the rotational direction T of the drill.

With this embodiment of the present invention, since the direction of extension K of the slit 17 is inclined as described above, when the first end portion 13A and the second end portion 13B are elastically deformed by the clamp bolt 40, the first end portion 13A, as shown in an exaggerated manner by the arrow sign (1) in FIG. 7, and the second end portion 13A, as shown in an exaggerated manner by the arrow sign (2) in FIG. 7, are elastically deformed so as to mutually approach together towards the axial line O, while being respectively, inclined towards the rearward side of the rotational direction T of the drill.

Due to this, the internal side surfaces 14B of the tip attachment seat 14, according to approaching towards the axial line O, become capable of pressing against the outer side surfaces 34 of the tip 30 almost along the rearward direction of the drill rotational direction T. The result of this is that the beneficial result is obtained that it is possible desirably to ensure the cutting edge deflection accuracy of the tip 30, also due to making strong close contact with one among the two side surfaces which constitute the convex portions 36 and one among the two side surfaces which constitute the guide grooves 15.

Furthermore although, with this embodiment of the present invention, as seen from the end of the direction of the axial line O, the direction of extension L of the through hole 20 is arranged to be inclined with respect to the direction of extension K of the slit 17, its direction is not limited to the above. For example, the direction of extension L of the through hole 20 may acceptably be arranged to be parallel to the widthwise direction N of the tip attachment seat 14. In this case, the angle of intersection α between the direction of extension L of the through hole 20 and the widthwise direction N of the tip attachment seat 14 is arranged to be 0°.

In the following, other preferred embodiments of the present invention will be explained. It should be understood that, in the following description, to portions which have the same structures as ones of the embodiment shown in FIGS. 1 through 5 and described above, and which have the same operational effects, the same reference symbols will be appended as in those figures, and the explanation thereof will be curtailed in the interests of brevity.

Figure 9:
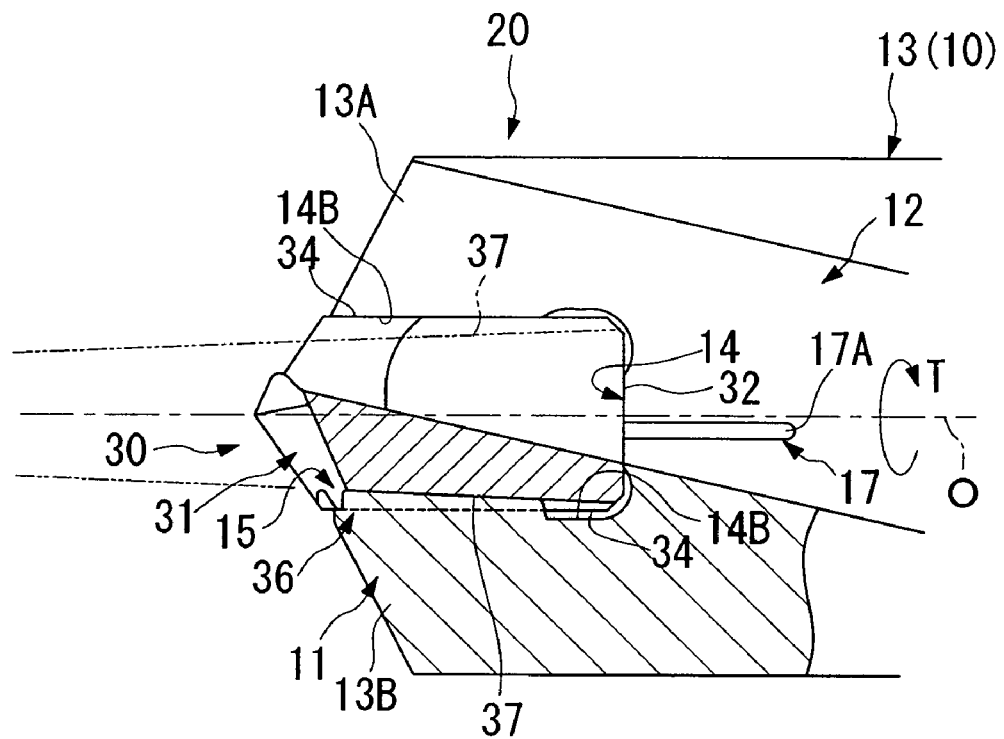
FIG. 9 is a partial vertical cross-sectional view of a throw-away tipped drill, showing another embodiment of the present invention.
Figure 10:
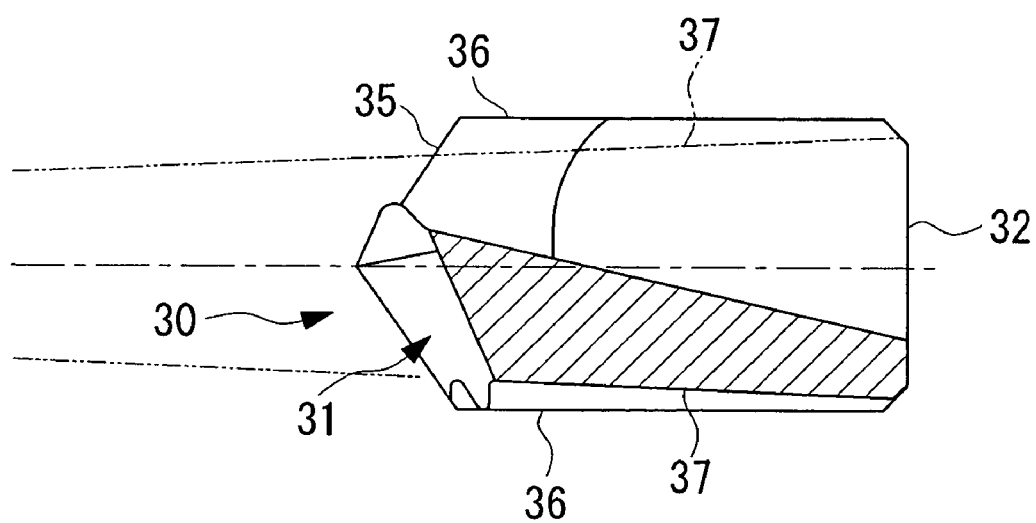
FIG. 10 is a partial vertical cross-sectional view showing an example of a tip which is fitted to this throw-away tipped drill according to the other embodiment of the present invention.

Another embodiment of the present invention is shown in FIGS. 9 and 10. With this throw-away tipped drill according to this embodiment of the present invention, to the region of the tip 30 to which the tip attachment seat 14 is engaged (in this embodiment, the region in which the convex portions 36 are formed), as shown in FIG. 10, an inclined portion 37 is provided which is extended in the outside thickness direction from the edge side along towards the rear end side. In this embodiment, the inclined portions 37 are formed in regions which are positioned between the ridge lines of neighboring convex portions 36, and the ridge lines of the convex portions 36, just like the outer side surfaces 34 of the tip 30, are made so as to be mutually roughly parallel. Furthermore, the gradient of the inclined portions 37 is made to be from 0°01' to 3°.

The tip 30 which has this construction is fitted to the drill main body 10 according to the same procedure as in the case of the first embodiment. In other words, it is inserted with respect to the concave groove shaped tip attachment seat 14 which is formed upon the end portion of the drill main body 10 by being slid towards the rear end side in the direction of the axial line O in the state in which the thickness direction of the tip 30 is kept parallel with the widthwise direction N of the tip attachment seat 14. Furthermore, when inserting the tip 30, the convex portions 36 which are formed upon the outer side surface 34 of the tip 30 are engaged with the guide grooves 15 which are formed upon the internal side surface 14B of the tip attachment seat 14.

And, by inserting the clamp bolt 40 into the through hole 20 which is provided in the end portion 13 of the drill main body 10, and by screwing the threaded portion 43 which is formed upon the shaft portion 42 of the clamp bolt 40 into the threaded portion 23 which is formed in the through hole 20, the first end portion 13A and the second end portion 13B are each elastically deformed so that they approach one another towards the axial line O. As a result, along with the pair of internal side surfaces 14B of the tip attachment seat 14 being pressed strongly against the pair of outer side surfaces 34 of the tip 30, the convex portions 36 and the guide grooves 15, which are mutually engaged together, are forcibly held together, and thereby, as shown in FIG. 9, the tip 30 is fitted to the tip attachment seat 14.

Here, in the case of this embodiment of the present invention, along with the convex portions 36 and the guide grooves 15 being caused to be mutually engaged together, the inclined portions 37 and the regions which are positioned between the bottom portions of each of the guide grooves 15 are also caused to be mutually engaged together. In particular, since the inclined portions 37 which extend from the edge side to the outside of the thickness direction along towards the rear end side are provided in the regions on the outer side surface 34 of the tip 30 which are engaged to the tip attachment seat 14, thereby, when the clamp bolt 40 is tightened up and the tip 30 is fitted to the tip attachment seat 14, as shown in FIG. 9, the tip attachment seat 14 comes to be in a state in which its edge side projects more to the inside than the rear end side.

In other words, in this state, the tip attachment seat 14 is elastically deformed into a shape which follows the inclined portion 37 which have been provided upon the outer side surface 34 of the tip 30, and tapers off in a concave groove shape as seen from the side surface. As a result, movement of the tip 30 towards the end of the drill main body 10 is restricted, and falling off of the tip 30 from the drill main body 10 is reliably prevented.

It should be understood that, with this tip 30, when the gradient of the inclined portions 37 is less than 0°01', the amount of deformation of the end portion of the drill main body 10 becomes small, so that the force which maintains the tip 30 in place may, undesirably, become insufficient. On the other hand, when this gradient exceeds 3°, the slope of the inclined portions 37 is too severe, and the deformation of the drill main body 10 does not follow along with it, so that the close cooperation together of the drill main body and the tip 30 is insufficient, with the result that the force which maintains the tip 30 in place may, undesirably, be deteriorated. Due to this, it is desirable that this gradient should be set to within the range of from 0°01' to 3°, and more desirably it should be within the range from $\frac{1}{100}$ to $\frac{2}{100}$.

Furthermore, with this tip 30, the convex portions 36 are made by forming grooves by grinding processing or the like upon the pair of outer side surfaces 34 of the tip 30, and are constituted by the regions which remain after this shaving off. During the grinding process which forms these convex portions 36, it is possible easily to form the inclined portions 37 which are defined between these convex portions 36, simply by shifting the grinding process with respect to the outer side surfaces 34 at an appropriate angle of inclination.

Figure 11:
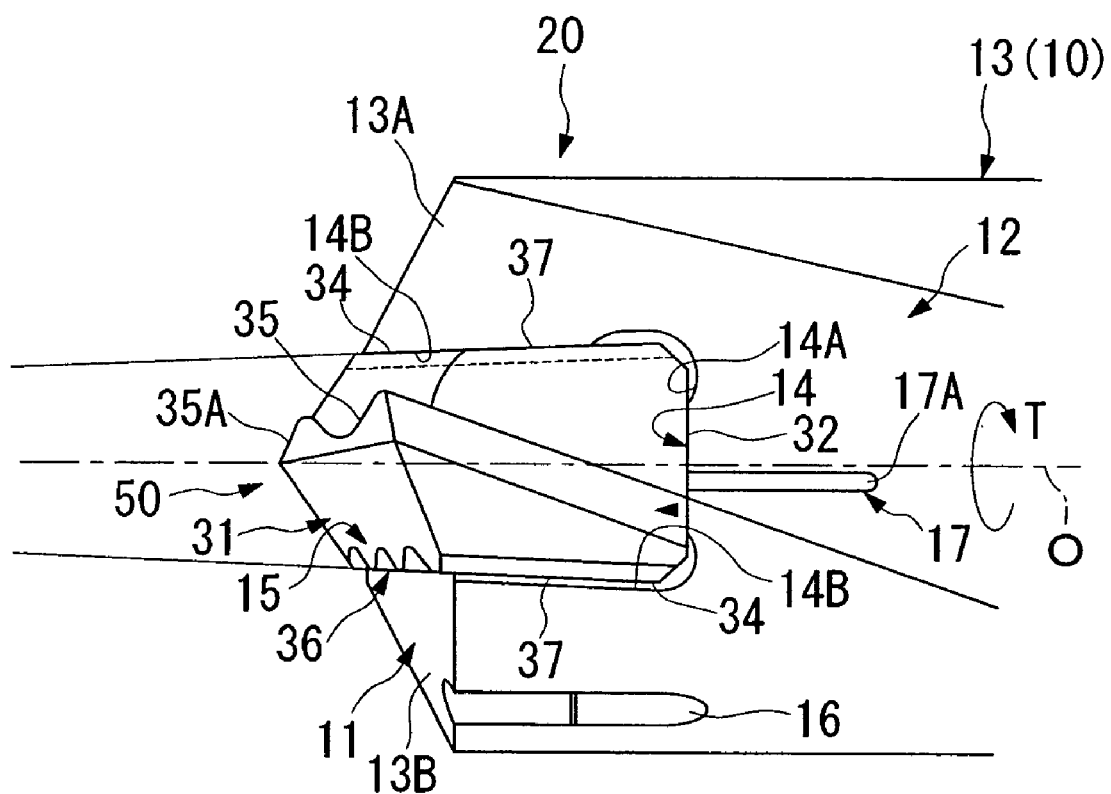
FIG. 11 is a side view showing a modified embodiment of a tip which is fitted to this throw-away tipped drill according to the other embodiment of the present invention.

Furthermore although, by way of example, with this embodiment of the present invention, it was shown that the inclined portions 37 were formed on the tip 30 in regions which were positioned between the ridge lines neighboring the convex portions 36, the regions in which the inclined portions 37 are formed are not limited to being these. For example, as with the tip 30 which is shown in FIG. 11, it would be acceptable to form the inclined portions 37, not only in the regions which are positioned between the ridge lines neighboring the convex portions 36, but over the entire outer side surfaces 34 of the tip 30, including the ridge lines of the convex portions 36.

In this case as well, the tip attachment seat 14 is elastically deformed into a shape which follows along the inclined portions 37 of the tip 30 by the tip 30 being engaged to the tip attachment seat 14 and by the clamp bolt 40 being tightened up, so that it becomes shaped as a concave groove which tapers off as viewed from the side surface. As a result, shifting of the tip 30 towards the end of the drill main body 10 is restricted, and falling off of the tip 30 from the drill main body 10 is reliably prevented.

Furthermore, instead of forming the inclined portions 37 in regions which are positioned between the ridge lines neighboring the convex portions 36, it would also be acceptable to form the inclined portions 37 upon the ridge lines of the convex portions 36, so that the regions which were positioned between the ridge lines neighboring the convex portions 36 were made to be mutually roughly parallel to one another, just like the outer side surfaces 34 of the tip 30.

Alternatively, on the tip 30, it would also be acceptable to make the region to which the tip attachment seat 14 is to be engaged as a roughly planar surface upon which no such convex portions 36 are formed, and to form the inclined portions 37 over the entirety of this roughly planar outer side surface 34.

In addition, on the tip 30, it is not necessary to form the inclined portions 37 over the entire region to which the tip attachment seat 14 is engaged; for example, it would also be acceptable to form them only in a portion of the region of the edge side of the tip 30.

Figure 12:
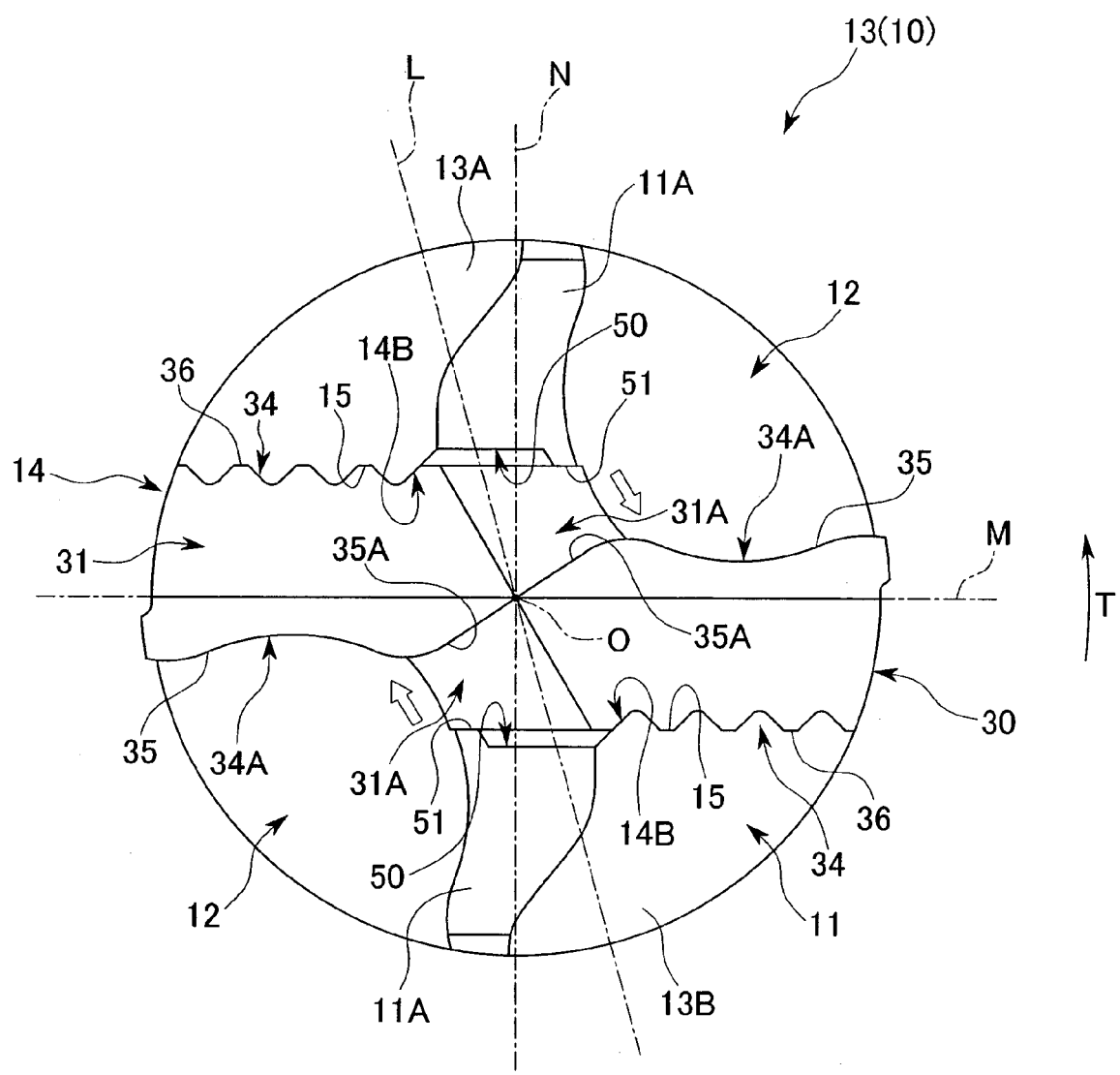
FIG. 12 is an end-on view of a throw-away tipped drill according to a further embodiment of the present invention.

A further embodiment of the present invention is shown in FIG. 12. With the throw-away drill according to this embodiment of the present invention, upon the side end portions of the pair of internal side surfaces 14B of the tip attachment seat 14, at portions towards the end portion which intersect with the wall surfaces of the chip disposal grooves 12, portions of the internal side surfaces 14B are dug out to just a predetermined depth, thus forming respective concave portions 50, so as to neighbor the portions on which the plurality of guide grooves 15 are formed (upon the internal side surfaces 14B, the portions which face forwards along the rotational direction T of the drill) along the direction of extension M of the tip attachment seat 14.

Furthermore, the concave portions 50 are respectively formed upon the side end portions of the pair of internal side surfaces 14B so as to arrive at the end portions which intersect with the wall surfaces of the chip disposal grooves 12. As a result, upon the pair of internal side surfaces 14B, the portions which extend to the above described other external peripheral side end portions remain as pressure portions 51 (to be described hereinafter) for pressing against the outer side surfaces 34 of the tip 30.

In other words, the pluralities of the guide groove 15 and the pressure portions 51 are arranged upon the pair of internal side surfaces 14B of the tip attachment seat 14 on opposite sides of the concave portions 50, at both end portions along the direction of extension of the tip attachment seat 14. To put it in another manner, the portions of the pair of internal side surfaces 14B upon which the pluralities of the guide groove 15 and the pressure portions 51 are not formed constitute the pressure portions 51. It should be understood that the length of the pressure portions 51 along the direction of extension M of the tip attachment seat 14 may be set to, for example, 1 mm.

Furthermore, as shown in FIG. 12, as seen from the end of the direction of the axial line O, the pressure portions 51 neighbor the concave portions 50 so as to be positioned more to the rearward side of the rotational direction T of the drill than the direction of extension L of the through hole 20 (the direction of extension of the through hole 20). In particular, in the case of this embodiment of the present invention, when the tip attachment seat 14 is divided at its central portion along its direction of extension M (in FIG. 12, its line N of intersection with the axial line O), the pressure portions 51 are adjacent to the concave portions 50, so as to be positioned more the rearward direction of the rotational direction T of the drill than the above described central portion.

With this embodiment of the present invention, the tip 30 is fitted to the drill main body by the same procedure as in the case of the first embodiment described above. That is to say, it is inserted with respect to the concave groove shaped tip attachment seat 14 which is formed at the end portion of the drill main body 10 by being slid along in the direction of the axial line O towards the rear end side, while being maintained in the state where the thickness direction of the tip 30 is kept parallel to the widthwise direction N of the tip attachment seat 14. Furthermore, when thus inserting the tip 30, the convex portions 36 which are formed upon the outer side surfaces 34 of the tip 30 are engaged with the guide grooves 15 which are formed upon the internal side surfaces 14B of the tip attachment seat 14.

And, by inserting the clamp bolt 40 into the through hole 20 which is provided at the end portion 13 of the drill main body 10, and by screwing the threaded portion 43 which is formed upon the shaft portion 42 of the clamp bolt 40 into the threaded portion 23 which is formed in the through hole 20, the first end portion 13A and the second end portion 13B are both elastically deformed so as to mutually approach towards one another on both sides of the axial line O. As a result, the pair of internal side surfaces 14B of the tip attachment seat 14 (accurately, the pressure portions 51) are both strongly pressed against the pair of outer side surfaces 34 of the tip 30, and also the convex portions 36 and the guide grooves 15 which are mutually engaged are also strongly pressed together, so that the tip 30 is fitted to the tip attachment seat 14.

With this embodiment of the present invention, since as described above the concave portions 50 are respectively provided upon the pair of internal side surfaces 14B of the tip attachment seat 14, thereby these concave portions 50 do not contact the outer side surfaces 34 of the tip 30, but instead, the pressure portions 51 which are adjacent to these concave portions 50 are contacted against the outer side surfaces 34 of the tip 30.

As has been described above, when seen from the end of the direction of the axial line O, the pressure portions 51 are positioned more towards the rearward side of the rotational direction T of the drill than the central line L of the clamp bolt 40. Due to this, when these pressure portions 51 are pressed against the outer side surfaces 34 of the tip 30 by the clamp bolt 40 being tightened up, the tip 30 which has been inserted into the tip attachment seat 14 experiences a force which tends to rotate it around the axial line O in the rearward direction to the rotational direction T of the drill (as shown by the white arrow signs in FIG. 12).

Accordingly, even though the pair of raked surfaces 34A of the tip 30 respectively open in the direction of the pair of chip disposal grooves 12, the undesirable occurrence does not happen, as in the prior art, that the tip 30 which is fitted to the tip attachment seat 14 juts out so as to rotate around the axial line O towards the forward side of the rotational direction T of the drill. As a result, the portions of the pair of outer side surfaces 34 of the tip 30 which face towards the rearward side of the rotational direction T of the drill are reliable held closely against the portions of the pair of internal side surfaces 14B of the tip attachment seat 14 towards the forward side of the rotational direction T of the drill, and thereby it is possible to fit the tip 30 strongly to the tip attachment seat 14.

Figure 13:
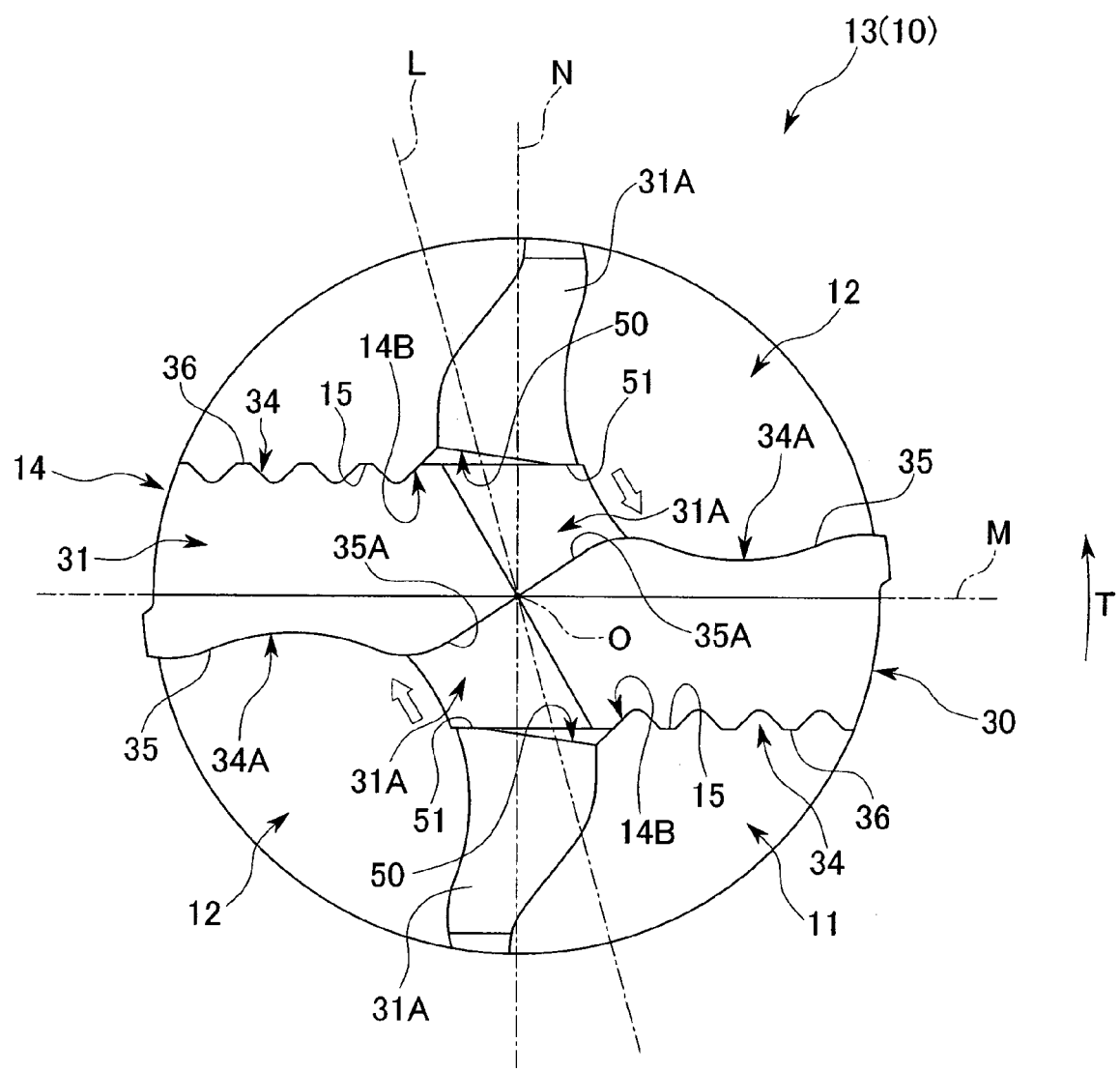
FIG. 13 is an end-on view showing a modified embodiment of the throw-away tipped drill of the further embodiment of the present invention.

It should be understood that although, with this embodiment of the present invention, the concave portions 50 which are respectively formed upon the pair of internal side surfaces 14B of the tip attachment seat 14 are formed by digging out portions of the internal side surfaces 14B to a predetermined depth, the concave portions 50 are not to be considered as being limited by this. For example it would also be acceptable, as shown in FIG. 13, to form the concave portions 50 by digging out portions of the internal side surfaces 14B of the tip attachment seat 14 towards the rear end side in the direction of the axial line O, and, by gradually reducing the depth of these concave portions 50 towards the side of the chip disposal grooves 12, to create the pressure portions 51 as remaining at the end portions where the internal side surfaces 14B intersect with the wall surfaces of the chip disposal grooves 12.

The essential point is that it is also possible, and acceptable, to make the concave portions 50 upon the pair of internal side surfaces 14B of the tip attachment seat 14 in a form which allows the pressure portions 51 to remain in the above manner, without losing any rigidity of the end portion 13 of the drill main body 10.

It should be understood that although, with the above described second and third embodiments of the present invention, examples have been shown in which the slit has been formed in the drill main body 10, it would also be acceptable to form no such slit 17 in the drill main body 10 at all.

Figure 14:
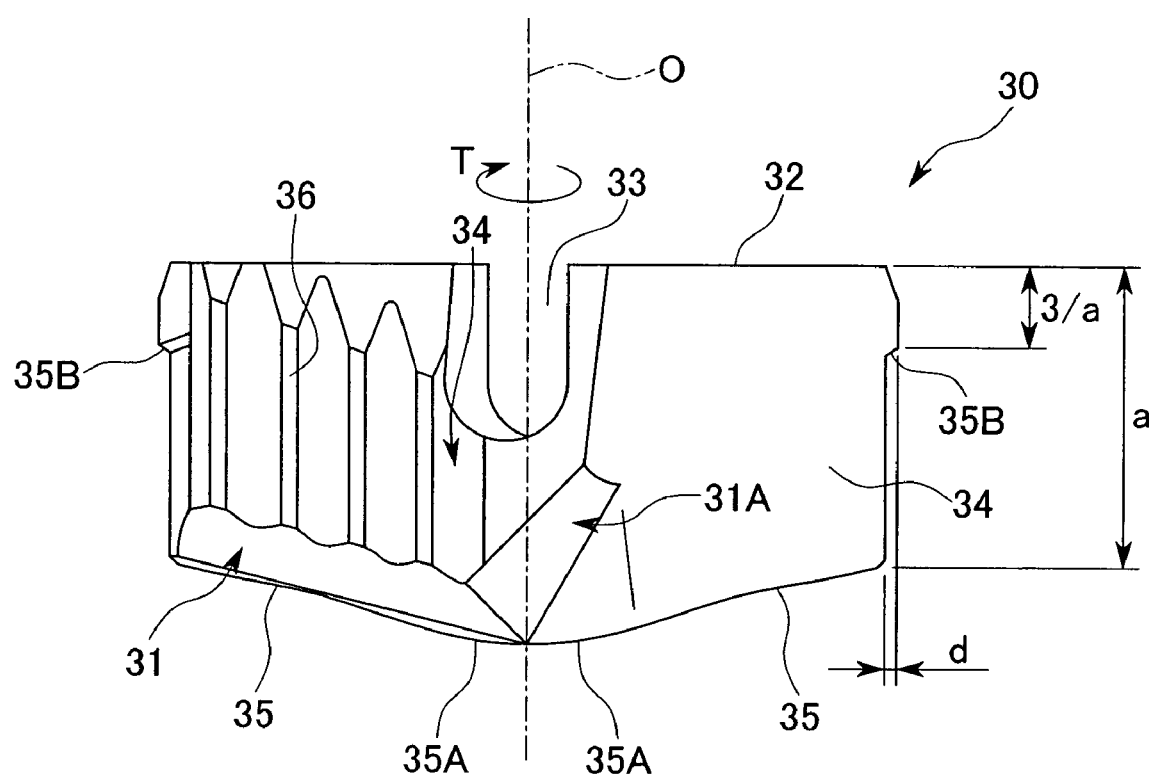
FIG. 14 is a side view showing an example of a tip which is fitted to this throw-away tipped drill of the present invention.

Furthermore, with the above described first through third embodiments of the present invention, it would also be acceptable to utilize, not a tip 30 as shown in FIG. 5, but rather, as shown for example in FIG. 14, a tip 30 which was made with, upon the cutting edge formed upon the edge of the tip 30, a rising edge 35B in which a portion including its outer peripheral edge is backed off by a predetermined interval to the rear end side of the direction of the axial line O. In concrete terms, the length d of this rising edge 35B along the diametrical direction of the drill main body 10 is set within the range of 0.01 mm to 0.10 mm, and the distance along the direction of the axial line O from the end of the rising edge 35B to the rear end face 32 of the tip 30 is set to about a/3, where the distance a is the distance along the direction of the axial line O from the outer peripheral edge of the cutting edge 35 to the rear end face 32 of the tip 30.

During the process of drilling a hole using a throw-away tipped drill to the tip attachment seat 14 of which the tip 30 shown in FIG. 14 is fitted, along with the process of forming the hole in the workpiece with the cutting edges 35 which are positioned at the end of the tip 30, it is possible to improve the processing of the inner wall surface of the hole which is made by the rising edges 35B which are positioned more to the rear than these cutting edges 35. As a result, the surface accuracy of the inner wall of the processed hole which is formed is enhanced. While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A throw-away tipped drill comprising:
   a throw-away tip of approximately a flat plate shape;
   a cutting edge formed upon an edge of said throw-away tip;
   said throw-away tip engaged to a concave groove shaped tip attachment seat which opens at an end surface of a drill main body which rotates around an axial line so as to divide the end portion of said drill main body into two portions;
   said drill main body having a pair of outer side surfaces respectively confront a pair of internal side surfaces of said tip attachment seat;
   a clamp bolt inserted into a through hole provided at an end portion of said drill main body so as to intersect said tip attachment seat:
   wherein a slit which extends towards the rear end of said axial line direction is formed upon the bottom surface of said tip attachment seat which faces towards the end of said axial line direction, and, when viewed from the end of said axial line direction, at the end portion of said drill main body which is divided into two by said tip attachment seat;

said slit is arranged as being displaced so as to be closer to a portion into which a shaft portion of said clamp bolt is threaded than to a side which is pressed by a head portion of said clamp bolt; and when seen from the end of said axial line direction, an angle of intersection between the direction of extension of said slit and the direction of extension of said clamp bolt is inclined from 90° by an angle $\beta$, where $0°<\beta\leq15°$).

2. A throw-away tipped drill, comprising:

a throw-away tip of approximately a flat plate shape;

a cutting edge formed upon an edge of said throw-away tip;

said throw-away tip engaged to a concave groove shaped tip attachment seat which opens at an end surface of a drill main body which rotates around an axial line so as to divide the end portion of said drill main body into two portions;

said drill main body having a pair of outer side surfaces respectively confront a pair of internal side surfaces of said tip attachment seat;

a clamp bolt inserted into a through hole provided at an end portion of said drill main body so as to intersect said tip attachment seat;

wherein, in the region of said throw-away tip which engages with said tip attachment seat, there is provided an inclined portion which extends to the outside of the thickness direction along from said edge towards the rear end side;

a plurality of convex portions formed upon each of the outer side surfaces of said throw-away tip which face said tip attachment seat and extend along the direction of said axial line, with said inclined portion being formed in regions between the ridge lines of these convex portions; and a plurality of guide grooves which can be engaged with said convex portions are formed on each of the internal side surfaces of said tip attachment seat, with the inclined portions and the regions which are positioned between the bottom portions of the guide grooves being mutually engaged together.

3. A throw-away tip which is fitted to a throw-away tipped drill as described in claim 2, further comprising:

an inclined portion provided in its region which engages with said tip attachment seat which extends to the outside of the thickness direction along from said edge towards the rear end side.

4. A throw-away tip as described in claim 3, wherein a gradient of said inclined portion is from 0°01' to 3°.

5. A throw-away tipped-drill comprising:

a throw-away tip of approximately a flat plate shape;

a cutting edge formed upon an edge of said throw-away tip;

said throw-away tip engaged to a concave groove shaped tip attachment seat which opens at an end surface of a drill main body which rotates around an axial line so as to divide the end portion of said drill main body into two portions;

said drill main body having a pair of outer side surfaces respectively confront a pair of internal side surfaces of said tip attachment seat;

a clamp bolt inserted into a through hole provided at an end portion of said drill main body so as to intersect said tip attachment seat;

wherein, in the region of said throw-away tip which engages with said tip attachment seat, there is provided an inclined portion which extends to the outside of the thickness direction along from said edge towards the rear end side;

an inclined portion is provided in its region which engages with said tip attachment seat which extends to the outside of the thickness direction along from said edge towards the rear end side; and a plurality of convex portions formed upon said outer side surface, which along with extending along said axial line direction, also engage with said tip attachment seat of said drill main body, and said inclined portions are provided in regions which are positioned between the ridge lines of these convex portions.

6. A drill main body which is used in a throw-away tipped drill as described in claim 2, further comprising:

a slit formed upon the bottom surface of said tip attachment seat which faces towards the end of said axial line direction which extends towards the rear end of said axial line direction.

7. A throw-away tipped drill, comprising:

a pair of chip disposal grooves formed on the outer peripheral surface of a drill main body which rotates around an axial line;

a concave groove shaped tip attachment seat formed at an end portion of said drill main body which, along with connecting to said pair of chip disposal grooves, also opens at an end surface of said drill main body; to said tip attachment seat;

a throw-away tip of approximately a flat plate shape;

a pair of cutting edges are formed upon an edge of said throw-away tip;

a pair of internal side surfaces of said tip attachment seat being mutually brought towards one another by a clamp bolt screwed into an end portion of said drill main body so that it crosses said tip attachment seat;

a pair of outer side surfaces of said throw-away tip respectively;

a pair of internal side surfaces of said tip attachment seat confronting said pair of outer side surfaces;

a pair of raked surfaces, which are portions of said pair of outer side surfaces of said throw-away tip which face towards the forward rotational direction of the drill, respectively open into said pair of chip disposal grooves; and:

concave portions formed on the internal side surfaces of said tip attachment seat which do not contact against the outer side surfaces of said throw-away tip; pressure portions are created as remaining adjacent to said concave portions, and are positioned more to the rearward direction of the rotational direction of the drill than the central axial line of said clamp bolt, so that, when said clamp bolt is tightened up, said pressure portions press against the outer side surfaces of said throw-away tipped drill so that said throw-away tip rotates about said axial line while facing towards the rearward direction of the rotational direction of the drill.

8. A throw-away tipped drill as described in claim 7, further comprising:

guide grooves which extend along said axial line direction being formed upon portions of the internal side surfaces of said tip attachment seat which face towards the forward direction of the rotational direction of the drill; convex portions which can engage to said guide grooves are formed upon portions of the outer side surfaces of said throw-away tip which face in the rearward direction of the rotational direction of the drill, wherein the guide grooves and these convex portions are mutually engaged together.

9. A throw-away tipped drill as described in claim 7, further comprising:
an inclined portion is provided in the region of said throw-away tip which engages with said tip attachment seat which extends to the outside of the thickness direction along from said edge towards the rear end side.

10. A throw-away tipped drill as described in claim 9, further comprising:
a plurality of convex portions which extend along said axial line direction formed upon the outer side surfaces of said throw-away tip which confront said tip attachment seat; said inclined portions are formed in the regions between the ridge lines of these convex portions; and
a plurality of guide grooves which can engage with said convex portions are formed upon the internal side surfaces of said tip attachment seat; and moreover these inclined portions and the regions which are positioned between the bottom portions of each of the guide grooves are mutually engaged together.

11. A throw-away tipped drill as described in claim 9, further comprising a gradient of said inclined portion is from 0°01' to 3°.

12. A throw-away tipped drill as described in claim 9, further comprising a slit which extends towards the rearward side of said axial line direction is formed upon the bottom surface of said tip attachment seat facing towards the end of said axial line direction, and, when seen from the end of said axial line direction, said slit is disposed, upon the end portion of said drill main body which is divided into two by said tip attachment seat, as being displaced so as to be closer to the portion into which the shaft portion of said clamp bolt is screwed, than to the side which is pressed by the head portion of said clamp bolt.

13. A throw-away tipped drill as described in claim 12, further comprising an angle of intersection when seen from the end of said axial line direction between the direction of extension of said slit and the direction of extension of said clamp bolt is set to be in the range of 90°±15°.

* * * * *